(12) United States Patent
Wray et al.

(10) Patent No.: US 11,084,504 B2
(45) Date of Patent: Aug. 10, 2021

(54) AUTONOMOUS VEHICLE OPERATIONAL MANAGEMENT SCENARIOS

(71) Applicants: Nissan North America, Inc., Franklin, TN (US); The University of Massachusetts, Boston, MA (US); Renault S.A.S., Boulogne-Billancourt (FR)

(72) Inventors: Kyle Hollins Wray, Fremont, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/758,286

(22) PCT Filed: Nov. 30, 2017

(86) PCT No.: PCT/US2017/064089
§ 371 (c)(1),
(2) Date: Apr. 22, 2020

(87) PCT Pub. No.: WO2019/108213
PCT Pub. Date: Jun. 6, 2019

(65) Prior Publication Data
US 2020/0331491 A1    Oct. 22, 2020

(51) Int. Cl.
*B60W 60/00*    (2020.01)
*G06K 9/00*    (2006.01)

(52) U.S. Cl.
CPC .. *B60W 60/0011* (2020.02); *B60W 60/00272* (2020.02); *B60W 60/00274* (2020.02); *G06K 9/00798* (2013.01); *B60W 2554/4049* (2020.02)

(58) Field of Classification Search
CPC ....... B60W 60/0011; B60W 60/00274; B60W 60/00272; B60W 2554/4049;
(Continued)

(56) References Cited

U.S. PATENT DOCUMENTS 4,751,570 A     6/1988   Robinson
5,615,116 A     3/1997   Gudat et al.
(Continued)

FOREIGN PATENT DOCUMENTS

CN      101655380 A    2/2010
CN      105216795 A    1/2016
(Continued)

OTHER PUBLICATIONS

Aoki, S. et al., A Merging Protocol for Self-Driving Vehicles, ICCPS, Apr. 2017.
(Continued)

*Primary Examiner* — Sze-Hon Kong
(74) *Attorney, Agent, or Firm* — Young Basile Hanlon & MacFarlane, P.C.

(57) ABSTRACT

Traversing, by an autonomous vehicle, a vehicle transportation network, may include operating a scenario-specific operational control evaluation module instance, wherein the scenario-specific operational control evaluation module instance includes an instance of a scenario-specific operational control evaluation model of a vehicle operational scenario wherein the vehicle operational scenario is a merge vehicle operational scenario or a pass-obstruction vehicle operational scenario, receiving a candidate vehicle control
(Continued)

action from the scenario-specific operational control evaluation module instance, and traversing a portion of the vehicle transportation network in accordance with the candidate vehicle control action.

20 Claims, 9 Drawing Sheets

(58) Field of Classification Search
CPC ...... B60W 30/18154; B60W 30/18163; G06K 9/00798; G08G 1/166; G01C 21/26
See application file for complete search history.

(56) References Cited

U.S. PATENT DOCUMENTS

| | | | |
|---|---|---|---|
| 8,762,006 | B2 | 6/2014 | Miller |
| 8,781,669 | B1 | 7/2014 | Teller et al. |
| 8,849,483 | B2 | 9/2014 | Kuwata et al. |
| 8,884,782 | B2 | 11/2014 | Rubin et al. |
| 9,081,651 | B2 | 7/2015 | Filev et al. |
| 9,103,671 | B1 | 8/2015 | Breed et al. |
| 9,494,439 | B1 | 11/2016 | Ross et al. |
| 9,568,915 | B1 | 2/2017 | Berntorp et al. |
| 9,646,428 | B1 | 5/2017 | Konrardy et al. |
| 9,972,054 | B1 | 5/2018 | Konrardy et al. |
| 10,029,701 | B2 | 7/2018 | Gordon et al. |
| 10,061,326 | B2 | 8/2018 | Gordon et al. |
| 10,126,135 | B2 | 11/2018 | Mortazavi et al. |
| 10,185,998 | B1 | 1/2019 | Konrardy et al. |
| 10,319,039 | B1 | 6/2019 | Konrardy et al. |
| 10,599,155 | B1 | 3/2020 | Konrardy et al. |
| 2004/0068351 | A1 | 4/2004 | Solomon |
| 2005/0057370 | A1 | 3/2005 | Warrior et al. |
| 2007/0021915 | A1 | 1/2007 | Breed et al. |
| 2007/0163096 | A1 | 7/2007 | Boutin |
| 2009/0088916 | A1 | 4/2009 | Elgersma et al. |
| 2009/0140887 | A1 | 6/2009 | Breed et al. |
| 2011/0016067 | A1 | 1/2011 | Levchuk et al. |
| 2012/0150437 | A1 | 6/2012 | Zeng et al. |
| 2012/0233102 | A1 | 9/2012 | James |
| 2012/0290152 | A1 | 11/2012 | Cheung et al. |
| 2014/0136414 | A1 | 5/2014 | Abhyanker |
| 2014/0222277 | A1 | 8/2014 | Tsimhoni et al. |
| 2014/0244114 | A1 | 8/2014 | Matsubara |
| 2014/0309838 | A1 | 10/2014 | Ricci |
| 2015/0039157 | A1 | 2/2015 | Wolfe et al. |
| 2015/0070156 | A1 | 3/2015 | Milburn, Jr. |
| 2015/0081156 | A1 | 3/2015 | Trepagnier et al. |
| 2015/0105961 | A1 | 4/2015 | Callow |
| 2015/0106010 | A1 | 4/2015 | Martin et al. |
| 2015/0153735 | A1 | 6/2015 | Clarke et al. |
| 2015/0183431 | A1 | 7/2015 | Nanami |
| 2015/0210274 | A1 | 7/2015 | Clarke et al. |
| 2015/0253772 | A1 | 9/2015 | Solyom et al. |
| 2015/0329130 | A1 | 11/2015 | Carlson et al. |
| 2015/0345966 | A1 | 12/2015 | Meuleau |
| 2015/0345967 | A1 | 12/2015 | Meuleau |
| 2015/0375748 | A1* | 12/2015 | Nagase ............ G06K 9/00825 701/41 |
| 2016/0068158 | A1 | 3/2016 | Elwart et al. |
| 2016/0129907 | A1 | 5/2016 | Kim et al. |
| 2016/0161270 | A1 | 6/2016 | Okumura |
| 2016/0209842 | A1 | 7/2016 | Thakur et al. |
| 2016/0209843 | A1 | 7/2016 | Meuleau et al. |
| 2016/0209848 | A1 | 7/2016 | Kojo et al. |
| 2016/0260328 | A1 | 9/2016 | Mishra et al. |
| 2016/0318511 | A1 | 11/2016 | Rangwala |
| 2016/0318515 | A1 | 11/2016 | Laur et al. |
| 2016/0334230 | A1 | 11/2016 | Ross et al. |
| 2016/0334797 | A1 | 11/2016 | Ross et al. |
| 2016/0335892 | A1 | 11/2016 | Okada et al. |
| 2016/0375766 | A1 | 12/2016 | Konet et al. |
| 2016/0375768 | A1 | 12/2016 | Konet et al. |
| 2017/0010108 | A1 | 1/2017 | Shashua |
| 2017/0010617 | A1 | 1/2017 | Shashua et al. |
| 2017/0031361 | A1* | 2/2017 | Olson ............... G06K 9/00791 |
| 2017/0032590 | A1 | 2/2017 | Stefan et al. |
| 2017/0038777 | A1 | 2/2017 | Harvey |
| 2017/0090478 | A1 | 3/2017 | Blayvas et al. |
| 2017/0090480 | A1 | 3/2017 | Ho et al. |
| 2017/0102700 | A1 | 4/2017 | Kozak |
| 2017/0158193 | A1* | 6/2017 | Lopez ..................... G08G 1/16 |
| 2017/0215045 | A1 | 7/2017 | Rasal et al. |
| 2017/0225760 | A1 | 8/2017 | Sidki et al. |
| 2017/0236422 | A1 | 8/2017 | Naka et al. |
| 2017/0261325 | A1 | 9/2017 | Schroeder et al. |
| 2017/0262790 | A1 | 9/2017 | Khasis |
| 2017/0277193 | A1 | 9/2017 | Frazzoli et al. |
| 2017/0329338 | A1 | 11/2017 | Wei et al. |
| 2017/0334451 | A1* | 11/2017 | Asakura ............... B60W 10/20 |
| 2017/0356746 | A1* | 12/2017 | Iagnemma ............ G01C 21/34 |
| 2017/0369062 | A1* | 12/2017 | Saigusa ................ B60W 30/16 |
| 2017/0369067 | A1* | 12/2017 | Saigusa ........... B60W 30/18163 |
| 2018/0004214 | A1 | 1/2018 | Wisniowski et al. |
| 2018/0011494 | A1 | 1/2018 | Zhu et al. |
| 2018/0029500 | A1 | 2/2018 | Katanoda |
| 2018/0046191 | A1* | 2/2018 | Keller ............. B60W 30/18163 |
| 2018/0129206 | A1* | 5/2018 | Harada ............. B60W 60/0053 |
| 2018/0173230 | A1 | 6/2018 | Goldman-Shenhar et al. |
| 2018/0232855 | A1* | 8/2018 | Kim ..................... G05D 1/0088 |
| 2018/0290657 | A1* | 10/2018 | Ryne .................. G06K 9/00818 |
| 2018/0341880 | A1 | 11/2018 | Kislovskiy et al. |
| 2018/0342033 | A1 | 11/2018 | Kislovskiy et al. |
| 2018/0348786 | A1* | 12/2018 | Yasui ................. B62D 15/0255 |
| 2018/0349785 | A1* | 12/2018 | Zheng .................. G05D 1/0287 |
| 2018/0373245 | A1* | 12/2018 | Nishi .................... G08G 1/167 |
| 2019/0047584 | A1 | 2/2019 | Donnelly |
| 2019/0096244 | A1 | 3/2019 | Guruva Reddiar et al. |
| 2019/0129436 | A1* | 5/2019 | Sun ......................... G06N 7/005 |
| 2019/0135281 | A1* | 5/2019 | Miura .................. G05D 1/0088 |
| 2019/0299991 | A1* | 10/2019 | Horii ...................... B60W 30/16 |
| 2019/0317506 | A1* | 10/2019 | Ishioka ................. B60W 50/10 |
| 2019/0329782 | A1* | 10/2019 | Shalev-Shwartz .......................... B60W 30/162 |
| 2019/0359209 | A1* | 11/2019 | Mizutani ............... B60W 30/12 |
| 2020/0079377 | A1* | 3/2020 | Yashiro .................. B60W 10/04 |
| 2020/0097008 | A1* | 3/2020 | Sadat ................. B60W 50/0097 |
| 2020/0279488 | A1* | 9/2020 | Shibasaki ............. B60W 30/12 |

FOREIGN PATENT DOCUMENTS

| | | |
|---|---|---|
| CN | 105620470 A | 6/2016 |
| CN | 105635849 A | 6/2016 |
| CN | 106103232 A | 11/2016 |
| CN | 106184223 A | 12/2016 |
| CN | 107339997 A | 11/2017 |
| DE | 102012005245 A1 | 9/2012 |
| DE | 102012220134 A1 | 5/2014 |
| DE | 102016203086 A1 | 8/2017 |
| EP | 2084690 A2 | 8/2009 |
| EP | 2902864 A1 | 8/2015 |
| EP | 2958783 A1 | 12/2015 |
| JP | H02-114304 A | 4/1990 |
| JP | 2007179388 A | 7/2007 |
| JP | 2015-199439 A | 11/2015 |
| JP | 2015191273 A | 11/2015 |
| JP | 2016017914 A | 2/2016 |
| JP | 2016139163 A | 8/2016 |
| JP | 201781426 A | 5/2017 |
| RU | 2436167 C1 | 12/2011 |
| WO | 2008/053373 A2 | 5/2008 |
| WO | 2012-172632 A1 | 12/2012 |
| WO | 2014/024336 A1 | 2/2014 |
| WO | 2014/130178 A1 | 8/2014 |
| WO | 2015/052865 A1 | 4/2015 |
| WO | 2015112651 A1 | 7/2015 |
| WO | 2016121572 A1 | 8/2016 |
| WO | 2016124178 A1 | 8/2016 |
| WO | 2016129067 A1 | 8/2016 |
| WO | 2016130719 A2 | 8/2016 |

(56) References Cited

FOREIGN PATENT DOCUMENTS

| WO | 2017/013746 A1 | 1/2017 |
|---|---|---|
| WO | 2018147872 A1 | 8/2018 |

OTHER PUBLICATIONS

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.
Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.
Kala et al.; Motion Planning of Autonomous Vehicles on a Dual Carriageway without Speed Lanes; Electronics; Jan. 13, 2015.
Matthews et al.; Intent Communication between Autonomous Vehicles and Pedestrians; 2015.
Ragi et al.; UAV path planning in a dynamic environment via partially observable Markov decision process; IEEE Transactions on Aerospace and Electronic Systems; Oct. 8, 2013.
International Application No. PCT/US2017/017493, filed Feb. 10, 2017.
International Application No. PCT/US2017/017502, filed Feb. 10, 2017.
International Application No. PCT/US2017/017516, filed Feb. 10, 2017.
International Application No. PCT/US2017/017527, filed Feb. 10, 2017.
U.S. Appl. No. 15/621,862; filed Jun. 13, 2017.
Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.
Wray et al., Online Decision-Making for Scalable Autonomous Systems; Conference: Twenty-Sixth International Joint Conference on Artificial Intelligence; Conference Paper • Aug. 2017 ; 7 pages https://www.researchgate.net/publication/318830226_Online_Decision-Making_for_Scalable_Autonomous_Systems.
Wray et al., Online Decision-Making for Scalable Autonomous Systems; Power Point Presentation; Aug. 23, 2017.
Miller, Tim, Explanation in Artificial Intelligence: Insights from the Social Sciences; Aug. 15, 2018; 66 pages; arXiv:1706.07269v3 ; https://arxiv.org/abs/1706.07269.
Bouton et al., Scalable Decision Making with Sensor Occlusions for Autonomous Driving; 2018 IEEE International Conference on Robotics and Automation (ICRA), Brisbane, Australia, May 21-25, 2018; 6 pages.
Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.
Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.
Extended European Search Report of corresponding application EP 17895657.9; dated Feb. 25, 2020; 9 pages.

\* cited by examiner

AUTONOMOUS VEHICLE OPERATIONAL MANAGEMENT SCENARIOS

CROSS-REFERENCE TO RELATED APPLICATION

This application is a 371 national stage of International Application Serial No. PCT/US2017/064089, filed Nov. 30, 2017, the entire disclosure of which is hereby incorporated by reference.

TECHNICAL FIELD

This disclosure relates to autonomous vehicle operational management and autonomous driving.

BACKGROUND

A vehicle, such as an autonomous vehicle, may traverse a portion of a vehicle transportation network. Traversing the portion of the vehicle transportation network may include generating or capturing, such as by a sensor of the vehicle, data, such as data representing an operational environment, or a portion thereof, of the vehicle. Accordingly, a system, method, and apparatus for autonomous vehicle operational management may be advantageous.

SUMMARY

Disclosed herein are aspects, features, elements, implementations, and embodiments of autonomous vehicle operational management.

An aspect of the disclosed embodiments is a method for use in traversing a vehicle transportation network by an autonomous vehicle. Traversing the vehicle transportation network includes operating a scenario-specific operational control evaluation module instance, wherein the scenario-specific operational control evaluation module instance includes an instance of a scenario-specific operational control evaluation model of a vehicle operational scenario wherein the vehicle operational scenario is a merge vehicle operational scenario or a pass-obstruction vehicle operational scenario, receiving a candidate vehicle control action from the scenario-specific operational control evaluation module instance, and traversing a portion of the vehicle transportation network in accordance with the candidate vehicle control action.

Another aspect of the disclosed embodiments is an autonomous vehicle including a processor configured to execute instructions stored on a non-transitory computer readable medium to operate a scenario-specific operational control evaluation module instance, wherein the scenario-specific operational control evaluation module instance includes an instance of a scenario-specific operational control evaluation model of a vehicle operational scenario wherein the vehicle operational scenario is a merge vehicle operational scenario or a pass-obstruction vehicle operational scenario, receive a candidate vehicle control action from the scenario-specific operational control evaluation module instance, and traverse a portion of the vehicle transportation network in accordance with the candidate vehicle control action.

Another aspect of the disclosed embodiments is a method for use in traversing a vehicle transportation network by an autonomous vehicle. The method includes operating operational environment monitors to identify a vehicle operational scenario. The operational environment monitors include a merge operational environment monitor, and, in response to a determination by the merge operational environment monitor that a first lane in the vehicle transportation network and a second lane of the vehicle transportation network merge to form the subsequent merged lane along an expected path for the autonomous vehicle, operating the operational environment monitor includes identifying a merge vehicle operational scenario as the vehicle operational scenario. The operational environment monitors include a pass-obstruction operational environment monitor, and, in response to a determination by the pass-obstruction operational environment monitor that an expected path for the autonomous vehicle includes a forward obstruction, the vehicle transportation network omits an available adjacent lane, and the vehicle transportation network includes an adjacent oncoming lane, operating the operational environment monitor includes identifying a pass-obstruction vehicle operational scenario as the vehicle operational scenario. The method includes, in response to receiving, from the operational environment monitor, operational environment information identifying the vehicle operational scenario, instantiating a scenario-specific operational control evaluation module instance, wherein the scenario-specific operational control evaluation module instance includes an instance of a scenario-specific operational control evaluation model of the vehicle operational scenario. In response to a determination that the vehicle operational scenario is the merge vehicle operational scenario, instantiating the scenario-specific operational control evaluation module instance includes instantiating a merge scenario-specific operational control evaluation module instance. In response to a determination that the vehicle operational scenario is the pass-obstruction vehicle operational scenario, instantiating the scenario-specific operational control evaluation module instance includes instantiating a pass-obstruction scenario-specific operational control evaluation module instance. The method includes receiving a candidate vehicle control action from the scenario-specific operational control evaluation module instance, and traversing a portion of the vehicle transportation network in accordance with the candidate vehicle control action. Traversing the portion of the vehicle transportation network in accordance with the candidate vehicle control action includes, in response to a determination that the vehicle operational scenario is the merge vehicle operational scenario, merging from a current lane in the vehicle transportation network to the subsequent merged lane, and in response to a determination that the vehicle operational scenario is the pass-obstruction vehicle operational scenario, traversing a first portion of the current lane, subsequent to traversing the first portion of the current lane, traversing a first portion of the oncoming lane, and subsequent to traversing the first portion of the oncoming lane, traversing a second portion of the current lane.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle. The operational environment monitors may include a blocking monitor that may determine probability of availability information for portions of the vehicle transportation network spatiotemporally proximate to the autonomous vehicle.

The autonomous vehicle operational management system may include an autonomous vehicle operational management controller, which may detect one or more operational scenarios, such as pedestrian scenarios, intersection scenarios, lane change scenarios, or any other vehicle operational scenario or combination of vehicle operational scenarios, corresponding to the external objects.

The autonomous vehicle operational management system may include one or more scenario-specific operational control evaluation modules. Each scenario-specific operational control evaluation module may be a model, such as a Partially Observable Markov Decision Process (POMDP) model, of a respective operational scenario. The autonomous vehicle operational management controller may instantiate respective instances of the scenario-specific operational control evaluation modules in response to detecting the corresponding operational scenarios.

The autonomous vehicle operational management controller may receive candidate vehicle control actions from respective instantiated scenario-specific operational control evaluation module instances, may identify a vehicle control action from the candidate vehicle control actions, and may control the autonomous vehicle to traverse a portion of the vehicle transportation network according to the identified vehicle control action.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

Figure 1:
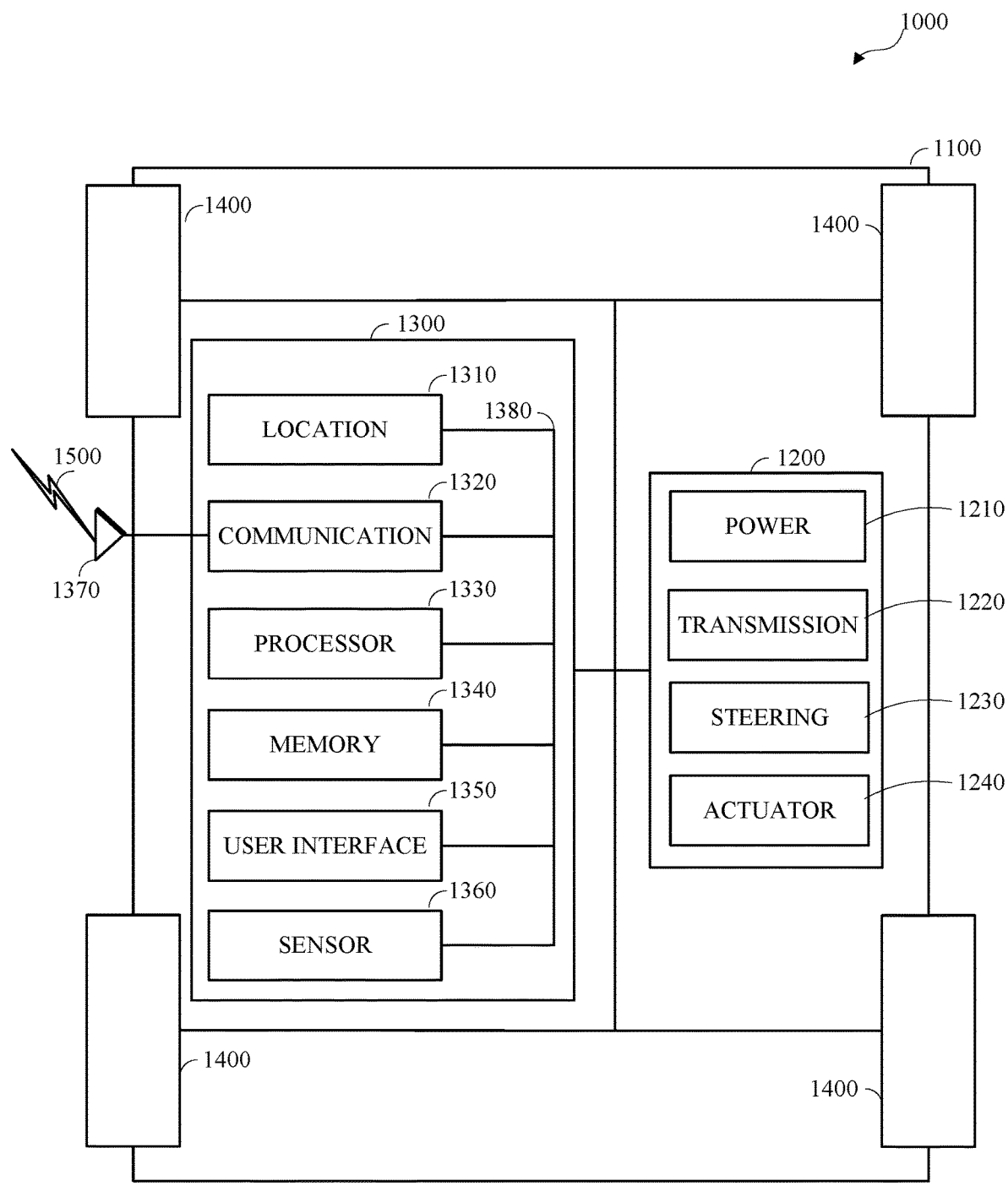
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS0) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
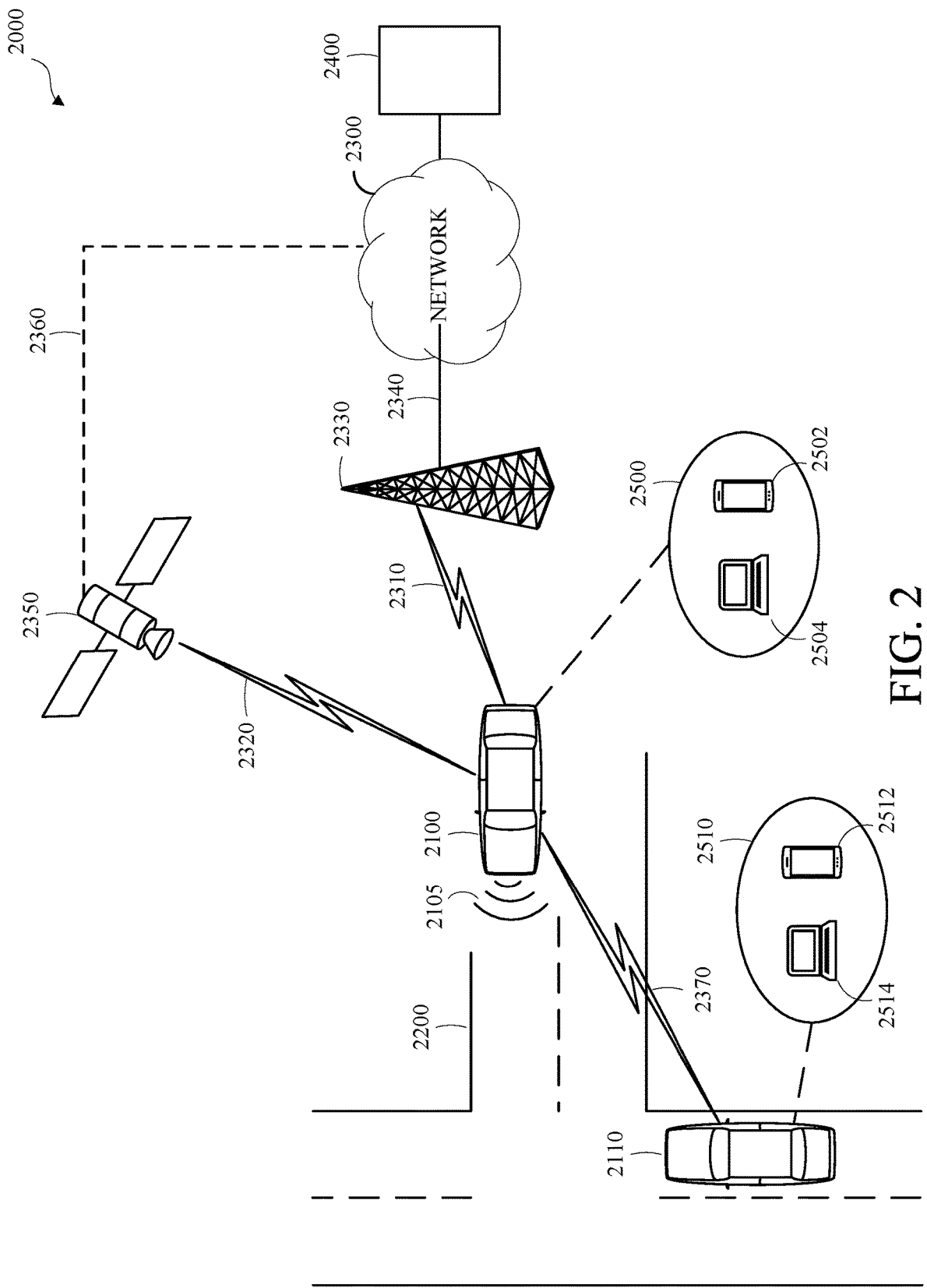
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more communication devices 2400, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and one communication device 2400, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
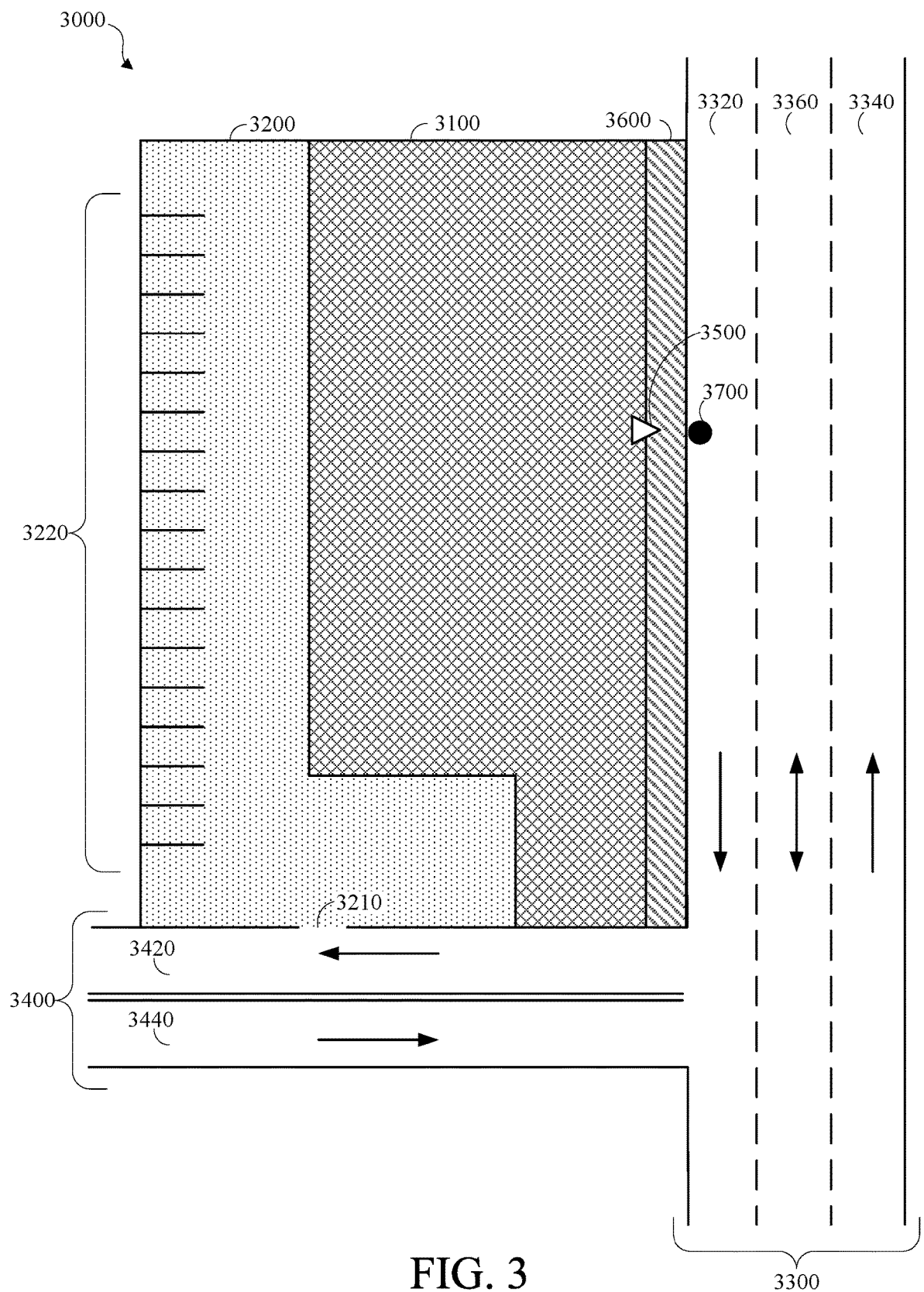
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400. The parking area 3200 may include parking slots 3220.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

A portion, or a combination of portions, of the vehicle transportation network may be identified as a point of interest or a destination. For example, the vehicle transportation network data may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network data may include defined entrance location information, such as information identifying a geolocation of an entrance associated with a destination.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network data may include docking location information, such as information identifying a geolocation of one or more docking locations 3700 associated with a destination. Although not shown separately in FIG. 3, the docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

Figure 4:
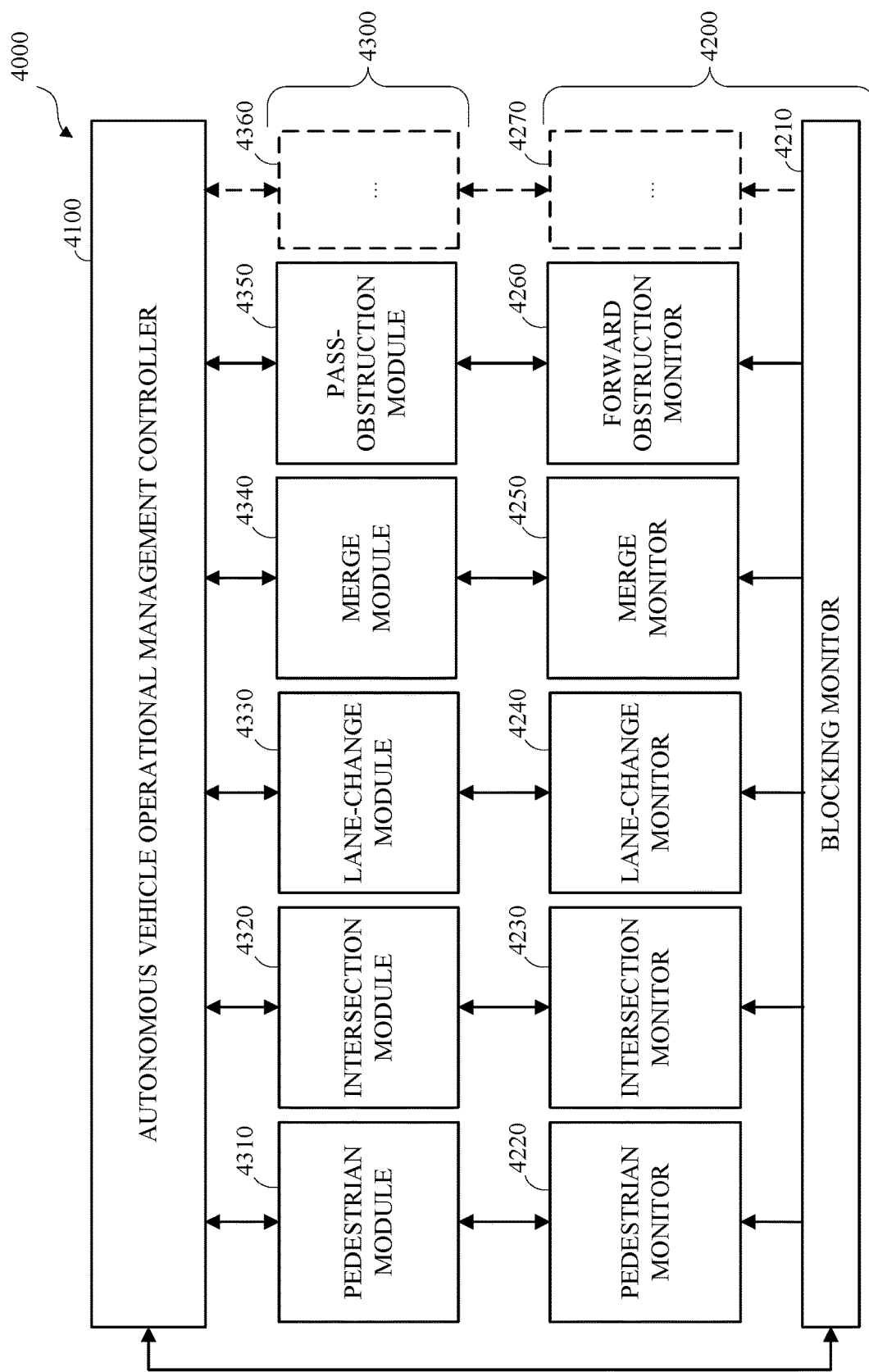
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 4, the autonomous vehicle operational management system 4000 includes an autonomous vehicle operational management controller 4100 (AVOMC), operational environment monitors 4200, and operation control evaluation modules 4300.

The AVOMC 4100, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 4100 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to an identified route for the autonomous vehicle, such as within a defined spatial distance, such as 300 meters, of portions of the vehicle transportation network along the identified route, which may include information indicating the geometry of one or more aspects of the vehicle transportation network, information indicating a condition, such as a surface condition, of the vehicle transportation network, or any combination thereof. The operational environment data may include information representing the vehicle transportation network proximate to the autonomous vehicle, such as within a defined spatial distance of the autonomous vehicle, such as 300 meters, which may include information indicating the geometry of one or more aspects of the vehicle transportation network, information indicating a condition, such as a surface condition, of the vehicle transportation network, or any combination thereof. The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitor the operational environment of the autonomous vehicle may include using operational environment data received from the operational environment monitors 4200.

The operational environment monitors 4200 may include scenario-agnostic monitors, scenario-specific monitors, or a combination thereof. A scenario-agnostic monitor, such as a blocking monitor 4210, may monitor the operational environment of the autonomous vehicle, generate operational environment data representing aspects of the operational environment of the autonomous vehicle, and output the operational environment data to one or more scenario-specific monitor, the AVOMC 4100, or a combination thereof. A scenario-specific monitor, such as a pedestrian monitor 4220, an intersection monitor 4230, a lane-change monitor 4240, a merge monitor 4250, or a forward obstruction monitor 4260, may monitor the operational environment of the autonomous vehicle, generate operational environment data representing scenario-specific aspects of the operational environment of the autonomous vehicle, and output the operational environment data to one or more scenario-specific operation control evaluation modules 4300, the AVOMC 4100, or a combination thereof. For example, the pedestrian monitor 4220 may be an operational environment monitor for monitoring pedestrians, the intersection monitor 4230 may be an operational environment monitor for monitoring intersections, the lane-change monitor 4240 may be an operational environment monitor for monitoring lane-changes, the merge monitor 4250 may be an operational environment monitor for merges, and the forward obstruction monitor 4260 may be an operational environment monitor for monitoring forward obstructions. An operational environment monitor 4270 is shown using broken lines to indicate that the autonomous vehicle operational management system 4000 may include any number of operational environment monitors 4200.

An operational environment monitor 4200 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 4220 may receive, or otherwise access, information, such as sensor data, which may indicate, correspond to, or may otherwise be associated with, one or more pedestrians in the operational environment of the autonomous vehicle. An operational environment monitor 4200 may associate the operational environment data, or a portion thereof, with the operational environment, or an aspect thereof, such as with an external object, such as a pedestrian, a remote vehicle, or an aspect of the vehicle transportation network geometry.

An operational environment monitor 4200 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 4200 may output the information representing the one or more aspects of the operational environment to, or for access by, the AVOMC 4100, such by storing the information representing the one or more aspects of the operational environment in a memory, such as the memory 1340 shown in FIG. 1, of the autonomous vehicle accessible by the AVOMC 4100, sending the information representing the one or more aspects of the operational environment to the AVOMC 4100, or a combination thereof. An operational environment monitor 4200 may output the operational environment data to one or more elements of the autonomous vehicle operational management system 4000, such as the AVOMC 4100. Although not shown in FIG. 4, a scenario-specific operational environment monitor 4220, 4230, 4240, 4250, 4260 may output operational environment data to a scenario-agnostic operational environment monitor, such as the blocking monitor 4210.

The pedestrian monitor 4220 may correlate, associate, or otherwise process the operational environment data to identify, track, or predict actions of one or more pedestrians. For example, the pedestrian monitor 4220 may receive information, such as sensor data, from one or more sensors, which may correspond to one or more pedestrians, the pedestrian monitor 4220 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 4220 may output the identified, associated, or generated pedestrian information to, or for access by, the AVOMC 4100.

The intersection monitor 4230 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 4230 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 4230 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and intersection monitor 4230 may output the identified, associated, or generated intersection information to, or for access by, the AVOMC 4100.

The lane-change monitor 4240 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 4240 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 4240 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles, and the lane-change monitor 4240 may output the identified, associated, or generated lane-change information to, or for access by, the AVOMC 4100.

The merge monitor 4250 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 4250 may associate the sensor data with one or more identified remote vehicles in the operational environment of the autonomous vehicle, one or more aspects of the operational environment of the autonomous vehicle or a combination thereof geospatially corresponding to a merge operation, which may include may identifying a current or expected direction of travel, a path, such as an expected path, a current or expected velocity, a current or expected acceleration rate, or a combination thereof for one or more of the respective identified remote vehicles, and the merge monitor 4250 may output the identified, associated, or generated merge information to, or for access by, the AVOMC 4100.

The forward obstruction monitor 4260 may correlate, associate, or otherwise process the operational environment information to identify one or more aspects of the operational environment of the autonomous vehicle geospatially corresponding to a forward pass-obstruction operation. For example, the forward obstruction monitor 4260 may identify vehicle transportation network geometry in the operational environment of the autonomous vehicle; the forward obstruction monitor 4260 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 4260 may identify, track, or predict actions of one or more remote vehicles in the operational environment of the autonomous vehicle. The forward obstruction monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation, the forward obstruction monitor 4250 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles, and the forward obstruction monitor 4250 may output the identified, associated, or generated forward obstruction information to, or for access by, the AVOMC 4100.

The blocking monitor 4210 may receive operational environment data representing an operational environment, or an aspect thereof, for the autonomous vehicle. The blocking monitor 4210 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 4210 may determine, or update, probabilities of availability continually or periodically. The blocking monitor 4210 may communicate probabilities of availability, or corresponding blocking probabilities, to the AVOMC 4100.

The AVOMC 4100 may identify one or more distinct vehicle operational scenarios based on one or more aspects of the operational environment represented by the operational environment data. For example, the AVOMC 4100 may identify a distinct vehicle operational scenario in response to identifying, or based on, the operational environment data indicated by one or more of the operational environment monitors 4200. The distinct vehicle operational scenario may be identified based on route data, sensor data, or a combination thereof. For example, the AVOMC 4100 may identifying one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 4100 may identify a pedestrian vehicle operational scenario, an intersection vehicle operational scenario, or both.

The AVOMC 4100 may instantiate respective instances of one or more of the operation control evaluation modules 4300 based on one or more aspects of the operational environment represented by the operational environment data. The operation control evaluation modules 4300 may include scenario-specific operation control evaluation modules (SSOCEMs), such as a pedestrian-SSOCEM 4310, an intersection-SSOCEM 4320, a lane-change-SSOCEM 4330, a merge-SSOCEM 4340, a pass-obstruction-SSOCEM 4350, or a combination thereof. A SSOCEM 4360 is shown using broken lines to indicate that the autonomous vehicle operational management system 4000 may include any number of SSOCEMs 4300. For example, the AVOMC 4100 may instantiate an instance of a SSOCEM 4300 in response to identifying a distinct vehicle operational scenario. The AVOMC 4100 may instantiate multiple instances of one or more SSOCEMs 4300 based on one or more aspects of the operational environment represented by the operational environment data. For example, the operational environment data may indicate two pedestrians in the operational environment of the autonomous vehicle and the AVOMC 4100 may instantiate a respective instance of the pedestrian-SSOCEM 4310 for each pedestrian based on one or more aspects of the operational environment represented by the operational environment data.

The AVOMC 4100 may send the operational environment data, or one or more aspects thereof, to another unit of the autonomous vehicle, such as the blocking monitor 4210 or one or more instances of the SSOCEMs 4300. For example, the AVOMC 4100 may communicate the probabilities of availability, or corresponding blocking probabilities, received from the blocking monitor 4210 to respective instantiated instances of the SSOCEMs 4300. The AVOMC 4100 may store the operational environment data, or one or more aspects thereof, such as in a memory, such as the memory 1340 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 4100 may receive one or more candidate vehicle control actions from respective instances of the SSOCEMs 4300. The AVOMC 4100 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The AVOMC 4100 may uninstantiate an instance of a SSOCEM 4300. For example, the AVOMC 4100 may identify a distinct set of operative conditions as indicating a distinct vehicle operational scenario for the autonomous vehicle, instantiate an instance of a SSOCEM 4300 for the distinct vehicle operational scenario, monitor the operative conditions, subsequently determine that one or more of the operative conditions has expired, or has a probability of affecting the operation of the autonomous vehicle below a defined threshold, and the AVOMC 4100 may uninstantiate the instance of the SSOCEM 4300.

The AVOMC 4100 may instantiate and uninstantiate instances of SSOCEMs 4300 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 4300 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 4300 may include one or more models of a respective distinct vehicle operational scenario. The autonomous vehicle operational management system 4000 may include any number of SSOCEMs 4300, each including models of a respective distinct vehicle operational scenario. A SSOCEM 4300 may include one or more models from one or more types of models. For example, a SSOCEM 4300 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 4300 may be ordered, such as hierarchically, such as based on accuracy. For example, a designated model, such as the most accurate model included in an SSOCEM 4300, may be identified as the primary model for the SSOCEM 4300 and other models included in the SSOCEM 4300 may be identified as secondary models.

In an example, one or more of the SSOCEMs 4300 may include a POMDP model, which may be a single-agent model. A POMDP model may model a distinct vehicle operational scenario, which may include modeling uncertainty, using a set of states (S), a set of actions (A), a set of observations ($\Omega$), a set of state transition probabilities (T), a set of conditional observation probabilities (O), a reward function (R), or a combination thereof. A POMDP model may be defined or described as a tuple $<S, A, \Omega, T, O, R>$.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operational scenario. Each state (state space), from a set of states (S) may include one or more defined state factors. Although some examples of state factors for some models are described herein, a model, including any model described herein, may include any number, or cardinality, of state factors. Each state factor may represent a defined aspect of the respective scenario, and may have a respective defined set of values. Although some examples of state factor values for some state factors are described herein, a state factor, including any state factor described herein, may include any number, or cardinality, of values.

An action from the set of actions (A) may indicate an available vehicle control action at each state in the set of states (S). A respective set of actions may be defined for each distinct vehicle operational scenario. Each action (action space), from a set of actions (A) may include one or more defined action factors. Although some examples of action factors for some models are described herein, a model, including any model described herein, may include any number, or cardinality, of action factors. Each action factor may represent an available vehicle control action, and may have a respective defined set of values. Although some examples of action factor values for some action factors are described herein, an action factor, including any action factor described herein, may include any number, or cardinality, of values.

An observation from the set of observations (Ω) may indicate available observable, measurable, or determinable data for each state from the set of states (S). A respective set of observations may be defined for each distinct vehicle operational scenario. Each observation (observation space), from a set of observations (Ω) may include one or more defined observation factors. Although some examples of observation factors for some models are described herein, a model, including any model described herein, may include any number, or cardinality, of observation factors. Each observations factor may represent available observations, and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: S×A×S→ [0, 1]. A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (O) may represent probabilities of making respective observations (Ω) based on the operational environment of the autonomous vehicle, as represented by the set of states (S), responsive to the actions of the autonomous vehicle, as represented by the set of actions (A), which may be represented as O: A×S×Ω→[0, 1]. A respective set of conditional observation probabilities (O) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→□.

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 4200 may identify occlusions, may identify or determine a probability that an external object is occluded, or hidden, by an identified occlusion, and may include occluded vehicle probability information in the operational environment data output to the AVOMC 4100, and communicated, by the AVOMC 4100, to the respective SSOCEMs 4300.

The autonomous vehicle operational management system 4000 may include any number or combination of types of models. For example, the pedestrian-SSOCEM 4310, the intersection-SSOCEM 4320, the lane-change-SSOCEM 4330, the merge-SSOCEM 4340, and the pass-obstruction-SSOCEM 4350 may be POMDP models. In another example, the pedestrian-SSOCEM 4310 may be a MDP model and the intersection-SSOCEM 4320 may be a POMDP model. The AVOMC 4100 may instantiate any number of instances of the SSOCEMs 4300 based on the operational environment data.

Instantiating a SSOCEM 4300 instance may include identifying a model from the SSOCEM 4300, and instantiating an instance of the identified model. For example, a SSOCEM 4300 may include a primary model and a secondary model for a respective distinct vehicle operational scenario, and instantiating the SSOCEM 4300 may include identifying the primary model as a current model and instantiating an instance of the primary model. Instantiating a model may include determining whether a solution or policy is available for the model. Instantiating a model may include determining whether an available solution or policy for the model is partially solved, or is convergent and solved. Instantiating a SSOCEM 4300 may include instantiating an instance of a solution or policy for the identified model for the SSOCEM 4300.

Solving a model, such as a POMDP model, may include determining a policy or solution, which may be a function, that maximizes an accrued reward, which may be determined by evaluating the possible combinations of the elements of the tuple, such as <S, A, Ω, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states (S), identifying an action from the set of action (A), determining a subsequent, or successor, state from the set of states (S) subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

Figure 5:
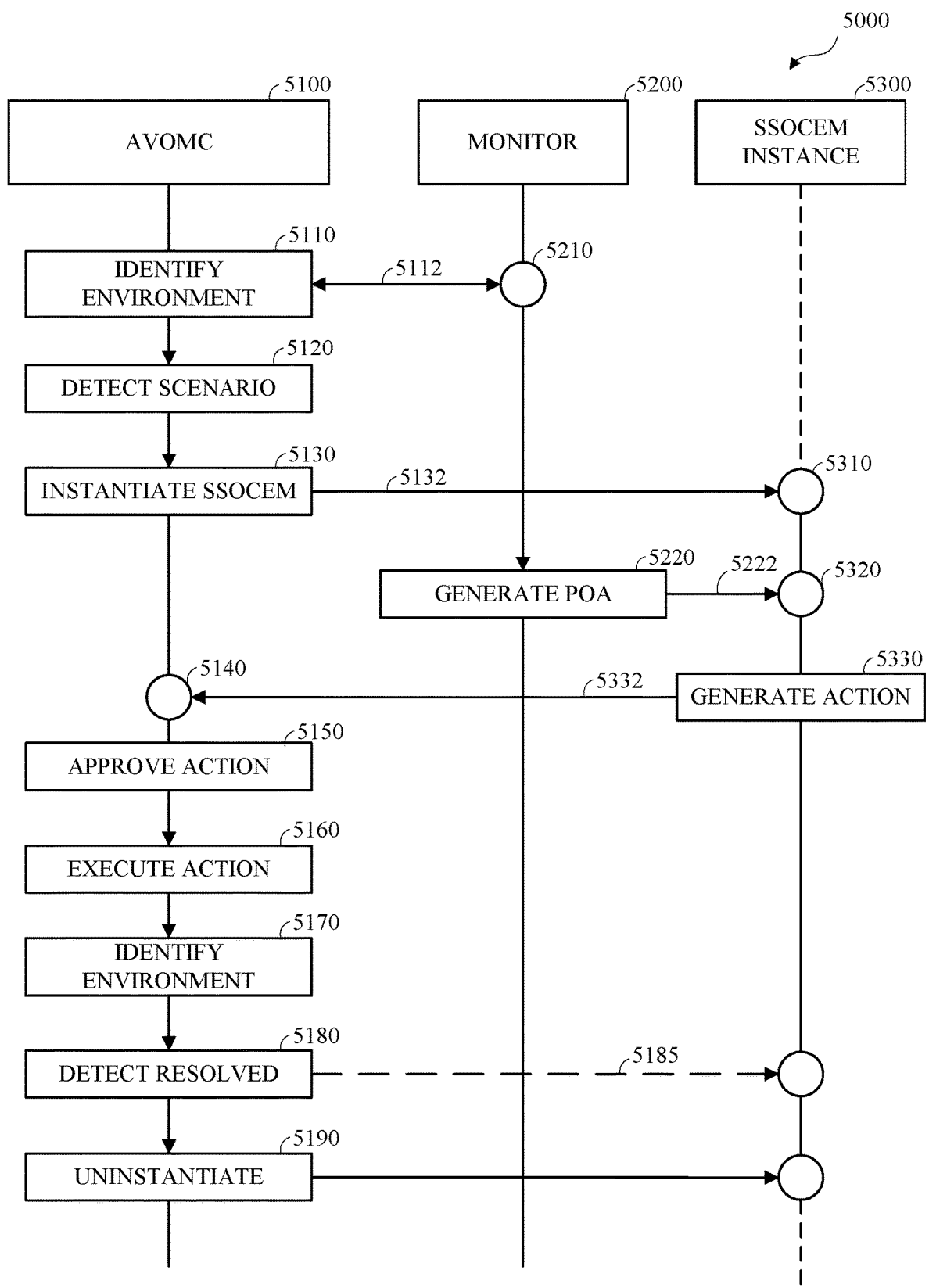
FIG. 5 is a flow diagram of an example of an autonomous vehicle operational management in accordance with embodiments of this disclosure.

FIG. 5 is a flow diagram of an example of autonomous vehicle operational management 5000 in accordance with embodiments of this disclosure. Autonomous vehicle operational management 5000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4.

As shown in FIG. 5, autonomous vehicle operational management 5000 includes implementing or operating the autonomous vehicle operational management system, including one or more modules or components thereof, which may include operating an autonomous vehicle operational management controller (AVOMC) 5100, such as the AVOMC 4100 shown in FIG. 4; operating operational environment monitors 5200, such as one or more of the operational environment monitors 4300 shown in FIG. 4; and operating a scenario-specific operational control evaluation module instance (SSOCEM instance) 5300, such as an instance of a SSOCEM 4300 shown in FIG. 4.

The AVOMC 5100 may monitor the operational environment of the autonomous vehicle, or defined aspects thereof, at 5110 to identify an operational environment, or an aspect thereof, of the autonomous vehicle. For example, operational environment monitors 5200 may monitor scenario-specific aspects of the operational environment and may send operational environment data representing the operational environment to the AVOMC 5100. Monitoring the operational environment of the autonomous vehicle may include identifying and tracking external objects at 5110, identifying distinct vehicle operational scenarios at 5120, or a combination thereof. For example, the AVOMC 5100, the operational environment monitors 5200, or both, may identify the operational environment data based on sensor data, vehicle data, route data, vehicle transportation network data, previously identified operational environment data, or any other available data, or combination of data, describing an aspect or aspects of the operational environment.

Identifying the operational environment may include identifying operational environment data representing the operational environment, or one or more aspects thereof. The operational environment data may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, along or proximate to a route identified for the autonomous vehicle, or a combination thereof. The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment data may include receiving information indicating one or more aspects of the operational environment from a sensor of the autonomous vehicle, such as the sensor 1360 shown in FIG. 1 or the on-vehicle sensors 2105 shown in FIG. 2. The sensor, or another unit of the autonomous vehicle, may store the sensor information in a memory, such as the memory 1340 shown in FIG. 1, of the autonomous vehicle and the AVOMC 5100 reading the sensor information from the memory.

Identifying the operational environment data may include identifying information indicating one or more aspects of the operational environment from vehicle transportation network data. For example, the AVOMC 5100 may read, or otherwise receive, vehicle transportation network data indicating that the autonomous vehicle is approaching an intersection, or otherwise describing a geometry or configuration of the vehicle transportation network proximate to the autonomous vehicle, such as within 300 meters of the autonomous vehicle.

Identifying the operational environment data at 5110 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

Identifying the operational environment data may include identifying information indicating one or more aspects of the operational environment from route data representing an identified route for the autonomous vehicle. For example, the AVOMC 5100 may read, or otherwise receive, vehicle transportation network data representing an identified route, such as a route identified in response to user input, for the autonomous vehicle.

The AVOMC 5100 and the operational environment monitors 5200 may communicate to identify the operational environment information as indicated at 5110, 5112, and 5210. Alternatively, or in addition, the operational environment monitors 5200 may receive the operational environment data from another component of the autonomous vehicle, such as from a sensor of the autonomous vehicle or from another operational environment monitor 5200, or the operational environment monitors 5200 may read the operational environment data from a memory of the autonomous vehicle.

The AVOMC 5100 may detect or identify one or more distinct vehicle operational scenarios at 5120, such as based on one or more aspects of the operational environment represented by the operational environment data identified at 5110.

The AVOMC 5100 may instantiate a SSOCEM instance 5300 based on one or more aspects of the operational environment represented by the operational environment data at 5130, such as in response to identifying a distinct vehicle operational scenario at 5120. Although one SSOCEM instance 5300 is shown in FIG. 5, the AVOMC 5100 may instantiate multiple SSOCEM instances 5300 based on one or more aspects of the operational environment represented by the operational environment data identified at 5110, each SSOCEM instance 5300 corresponding to a respective distinct vehicle operational scenario detected at 5120, or a combination of a distinct external object identified at 5110 and a respective distinct vehicle operational scenario detected at 5120. Instantiating a SSOCEM instance 5300 at 5130 may include sending the operational environment data representing an operational environment for the autonomous vehicle to the SSOCEM instance 5300 as indicated at 5132. The SSOCEM instance 5300 may receive the operational environment data representing an operational environment for the autonomous vehicle, or one or more aspects thereof, at 5310. Instantiating a SSOCEM instance 5300 at 5130 may include identifying a model, such as a primary model or a secondary model, of the distinct vehicle operational scenario, instantiating an instance of the model, identifying a solution or policy corresponding to the model, instantiating an instance of the solution or policy, or a combination thereof.

The operational environment monitors 5200 may include a blocking monitor, such as the blocking monitor 4210 shown in FIG. 4, which may determine a respective probability of availability (POA), or corresponding blocking probability, at 5220 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. The blocking monitor may send the probabilities of availability identified at 5220 to the SSOCEM instance 5300 at 5222. Alternatively, or in addition, the blocking monitor may store the probabilities of availability identified at 5220 in a memory of the autonomous vehicle. Although not expressly shown in FIG. 5, the blocking monitor may send the probabilities of availability identified at 5220 to the AVOMC 5100 at 5222 in addition to, or in alternative to, sending the probabilities of availability to the SSOCEM instance 5300. The SSOCEM instance 5300 may receive the probabilities of availability at 5320.

The SSOCEM instance 5300 may generate or identify a candidate vehicle control action at 5330. For example, the SSOCEM instance 5300 may generate or identify the candidate vehicle control action at 5330 in response to receiving the operational environment data 5310, receiving the probability of availability data at 5320, or both. For example, the instance of the solution or policy instantiated at 5310 for the model of the distinct vehicle operational scenario may output the candidate vehicle control action based on the operational environment data, the probability of availability data, or both. The SSOCEM instance 5300 may send the candidate vehicle control action identified at 5330 to the AVOMC 5100 at 5332. Alternatively, or in addition, the SSOCEM instance 5300 may store the candidate vehicle control action identified at 5330 in a memory of the autonomous vehicle.

The AVOMC 5100 may receive a candidate vehicle control action at 5140. For example, the AVOMC 5100 may receive the candidate vehicle control action from the SSOCEM instance 5300 at 5140. Alternatively, or in addition, the AVOMC 5100 may read the candidate vehicle control action from a memory of the autonomous vehicle.

The AVOMC 5100 may approve the candidate vehicle control action, or otherwise identify the candidate vehicle control action as a vehicle control action for controlling the autonomous vehicle to traverse the vehicle transportation network, at 5150. Approving a candidate vehicle control action at 5150 may include determining whether to traverse a portion of the vehicle transportation network in accordance with the candidate vehicle control action.

The AVOMC 5100 may control, or may provide the identified vehicle control action to another vehicle control unit, the autonomous vehicle to traverse the vehicle transportation network, or a portion thereof, at 5160 in accordance with the vehicle control action identified at 5150.

The AVOMC 5100 may identify an operational environment, or an aspect thereof, of the autonomous vehicle at 5170. Identifying an operational environment, or an aspect thereof, of the autonomous vehicle at 5170 may be similar to identifying the operational environment of the autonomous vehicle at 5110 and may include updating previously identified operational environment data.

The AVOMC 5100 may determine or detect whether a distinct vehicle operational scenario is resolved or unresolved at 5180. For example, the AVOMC 5100 may receive operation environment information continuously or on a periodic basis, as described above. The AVOMC 5100 may evaluate the operational environment data to determine whether the distinct vehicle operational scenario has resolved.

The AVOMC 5100 may determine that the distinct vehicle operational scenario corresponding to the SSOCEM instance 5300 is unresolved at 5180, the AVOMC 5100 may send the operational environment data identified at 5170 to the SSOCEM instances 5300 as indicated at 5185, and uninstantiating the SSOCEM instance 5300 at 5180 may be omitted or differed.

The AVOMC 5100 may determine that the distinct vehicle operational scenario is resolved at 5180 and may uninstantiate at 5190 the SSOCEM instances 5300 corresponding to the distinct vehicle operational scenario determined to be resolved at 5180. For example, the AVOMC 5100 may identify a distinct set of operative conditions forming the distinct vehicle operational scenario for the autonomous vehicle at 5120, may determine that one or more of the operative conditions has expired, or has a probability of affecting the operation of the autonomous vehicle below a defined threshold at 5180, and may uninstantiate the corresponding SSOCEM instance 5300.

Although not expressly shown in FIG. 5, the AVOMC 5100 may continuously or periodically repeat identifying or updating the operational environment data at 5170, determining whether the distinct vehicle operational scenario is resolved at 5180, and, in response to determining that the distinct vehicle operational scenario is unresolved at 5180, sending the operational environment data identified at 5170 to the SSOCEM instances 5300 as indicated at 5185, until determining whether the distinct vehicle operational scenario is resolved at 5180 includes determining that the distinct vehicle operational scenario is resolved.

Figure 6:
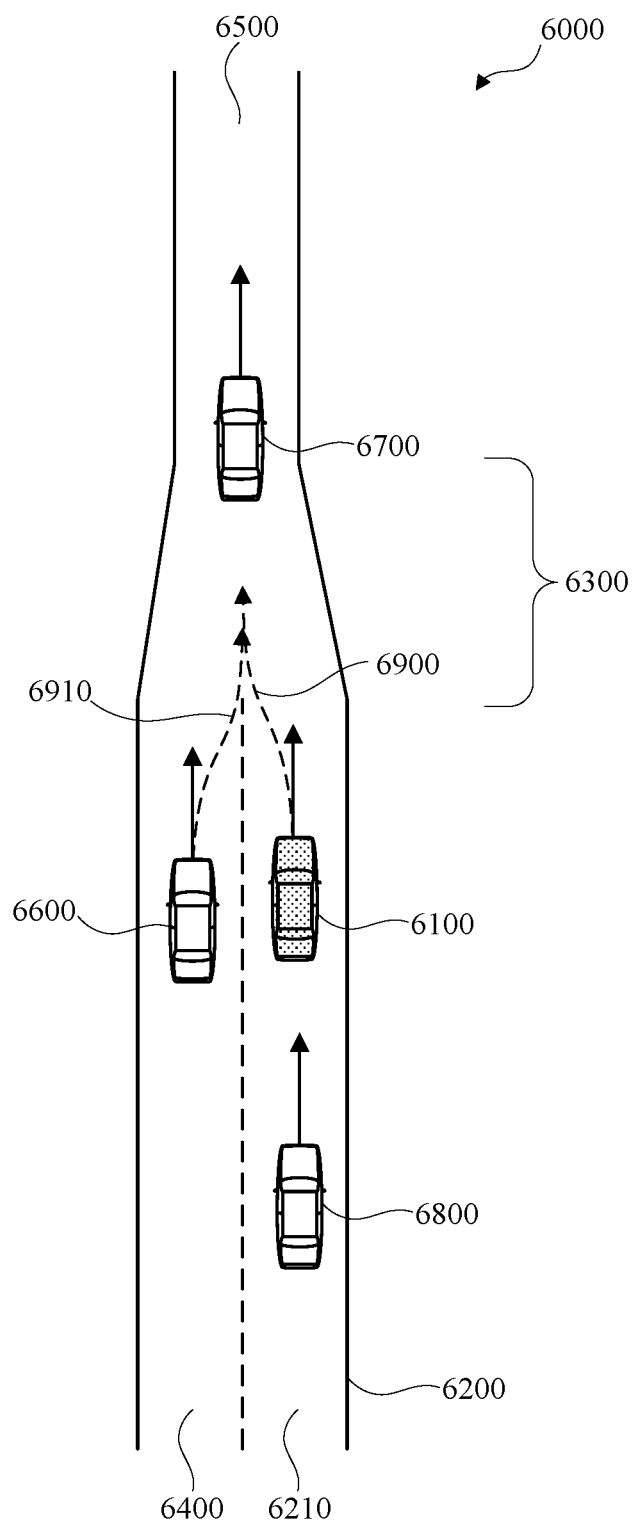
FIG. 6 is a diagram of an example of a merge scene in accordance with embodiments of this disclosure.
Figure 7:
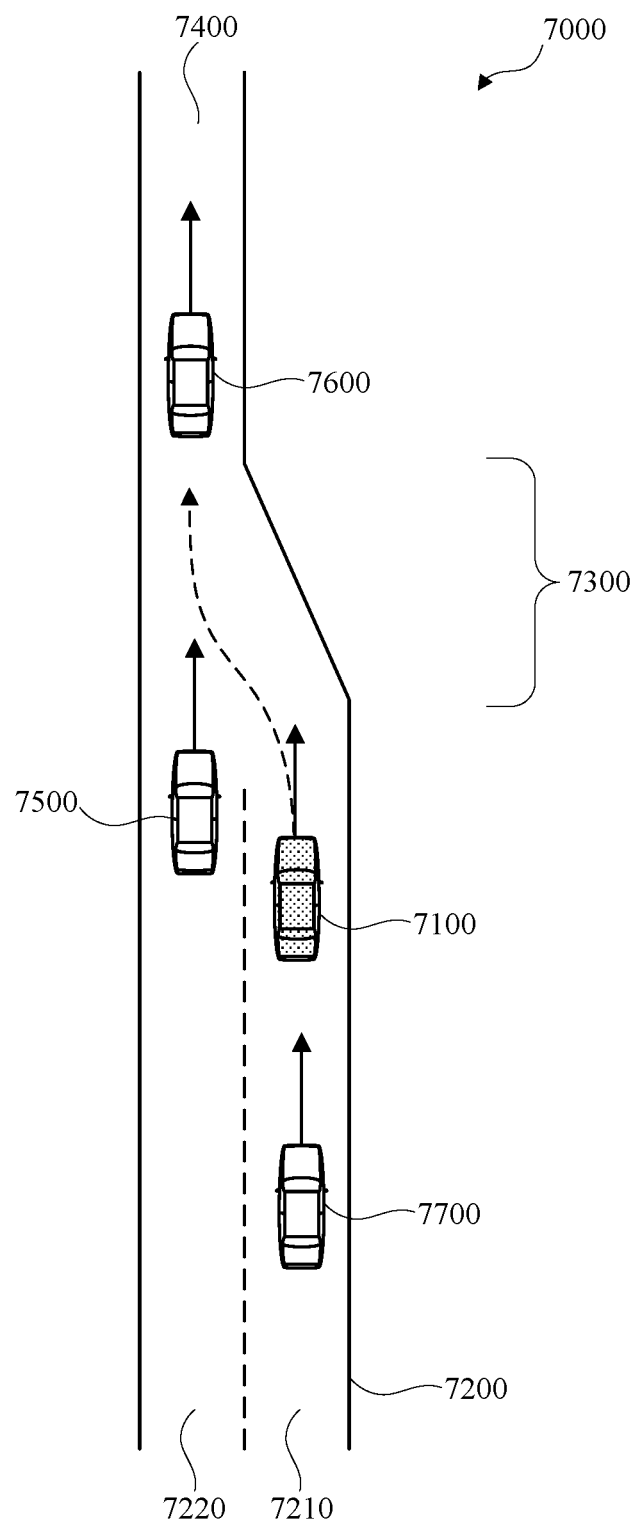
FIG. 7 is a diagram of another example of a merge scene in accordance with embodiments of this disclosure.
Figure 8:
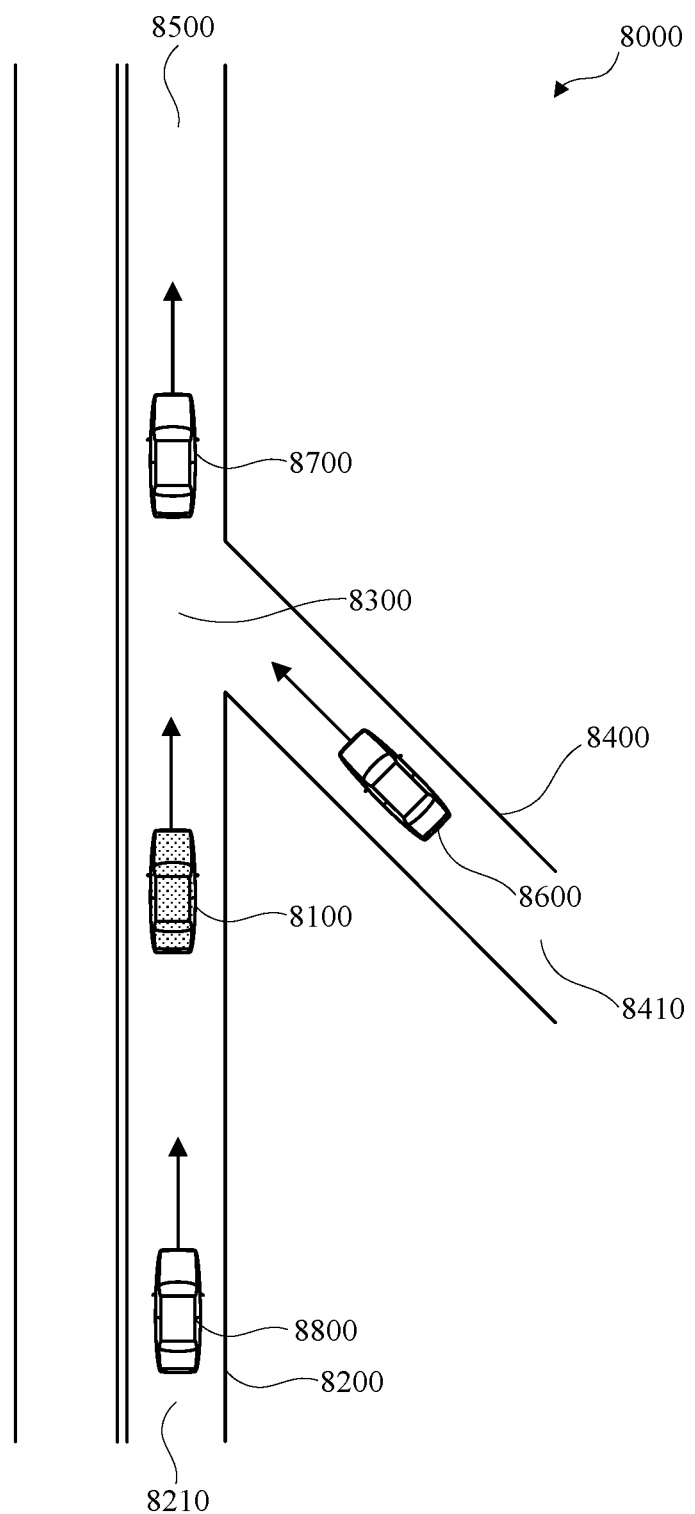
FIG. 8 is a diagram of another example of a merge scene in accordance with embodiments of this disclosure.

FIGS. 6-8 show examples that include merge scenarios. In a merge scenario, a portion of the vehicle transportation network includes two or more lanes, such as two adjacent lanes from a first road or a first lane from a first road and a second lane from a second road, that intersect and merge at a merge-intersection to form a subsequent, relative to a direction of travel of the lanes, merged lane. An autonomous vehicle may traverse a merge scenario by merging, at the merge-intersection, into the subsequent merged lane. Merge scenarios may be similar to lane-change scenarios, except as described herein or otherwise clear from context. For example, a merge scenario may be associated with a defined, fixed, geospatial location (the merge-intersection), which may be based on defined aspects of the vehicle transportation network, and, for traversal of a portion of the vehicle transportation network that includes a merge scenario, a vehicle control action that omits merging into the subsequent merge lane may be unavailable. A lane-change scenario may be associated with relative locations and, for traversal of a portion of the vehicle transportation network that includes a lane-change scenario, a vehicle control action that omits changing-lanes may be available. In another example, the probabilities of remote vehicle actions for a merge scenario may differ from a similar lane-change scenario. An example of a merge scenario wherein two adjacent lanes end and a subsequent merged lane begins at a merge-intersection is shown in FIG. 6. An example of a merge scenario wherein a first adjacent lane ends and a second adjacent lane becomes a subsequent merged lane at a merge-intersection is shown in FIG. 7. An example of a merge scenario wherein a lane of a first road becomes a subsequent merged lane and a lane of a second road ends at a merge-intersection is shown in FIG. 8. Other vehicle transportation network configurations may be used for merge scenarios.

FIG. 6 is a diagram of an example of a merge scene 6000 portion of a vehicle transportation network including a merge scenario in accordance with embodiments of this disclosure. Autonomous vehicle operational management may include an autonomous vehicle 6100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 5000 shown in FIG. 5, including a merge-SSOCEM, such as the merge-SSOCEM 5410 shown in FIG. 5, which may include a model of an autonomous vehicle operational control scenario that includes the autonomous vehicle 6100 traversing a portion of the vehicle transportation network along a first road 6200 in a first lane 6210 approaching a merge-intersection 6300 (merge scenario). For simplicity and clarity, the portion of the vehicle transportation network corresponding to the merge scene 6000 shown in FIG. 6 is oriented with north at the top and east at the right.

The portion of the vehicle transportation network corresponding to the merge scene 6000 shown in FIG. 6 includes the autonomous vehicle 6100 traversing northward along a road segment in the first lane 6210 of the first road 6200, adjacent to a second lane 6400 of the first road 6200, approaching the merge-intersection 6300. The first lane 6210 and the second lane 6400 merge at the merge-intersection 6300 to form a subsequent merged lane 6500 of the first road 6200. Although the first lane 6210, the second lane 6400, and the merge lane 6500 are shown separately, respective portions of the first lane 6210, the second lane 6400, and the merge lane 6500 may overlap in the merge-intersection 6300. A first remote vehicle 6600 is traversing the second lane 6400, approaching the merge-intersection 6300. A second remote vehicle 6700 is traversing the subsequent merged lane 6500 ahead of the autonomous vehicle 6100. A third remote vehicle 6800 is traversing the first lane 6210 behind the autonomous vehicle 6100.

The autonomous vehicle operational management system may operate continuously or periodically, such as at each temporal location in a sequence of temporal locations. A first, sequentially earliest, temporal location from the sequence of temporal locations may correspond with operating the autonomous vehicle, which may include traversing a portion of the vehicle transportation network by the autonomous vehicle or receiving or identifying an identified route for traversing the vehicle transportation network by the autonomous vehicle. For simplicity and clarity, the respective geospatial location of the autonomous vehicle 6100, the first remote vehicle 6600, the second remote vehicle 6700, and the third remote vehicle 6800 is shown in accordance with a temporal location from the sequence of temporal locations corresponding to a spatial location in the vehicle transportation network proximate to the merge-intersection 6300. Although described with reference to a sequence of temporal locations for simplicity and clarity, each unit of the autonomous vehicle operational management system may operate at any frequency, the operation of respective units may be synchronized or unsynchronized, and operations may be performed concurrently with one or more portions of one or more temporal locations. For simplicity and clarity, respective descriptions of one or more temporal locations, such as temporal locations between the temporal locations described herein, may be omitted from this disclosure.

The autonomous vehicle operational management system of the autonomous vehicle 6100 may operate a merge monitor, such as the merge monitor 5310 shown in FIG. 5, which may include instantiating the merge monitor. The merge monitor may process or evaluate vehicle transportation network data, such as map data, sensor data, or a combination thereof, representing a portion of the vehicle transportation network, such as a portion corresponding to an identified route for the autonomous vehicle 6100, a portion spatially proximate to the autonomous vehicle 6100, or an expected path for the autonomous vehicle 6100, or a combination thereof. For example, the identified route for the autonomous vehicle 6100, an expected path for the autonomous vehicle 6100, or both, may include, or may be proximate to, the merge-intersection 6300 and the merge monitor may identify a candidate merge scenario corresponding to the autonomous vehicle 6100 traversing the portion of the vehicle transportation network including the merge-intersection 6300. In another example, the sensors of the autonomous vehicle 6100 may detect information corresponding to the operational environment of the autonomous vehicle 6100, such as information indicating that the geometry of the vehicle transportation network along the expected path for the autonomous vehicle includes the merge-intersection, information corresponding to one or more of the remote vehicles 6600, 6700, 6800, or a combination thereof.

The merge monitor may identify or generate operational environment information representing the operational environment, or an aspect thereof, of the autonomous vehicle 6100, which may include associating the sensor information with the remote vehicles 6600, 6700, 6800, and may output the operational environment information, which may include information representing the remote vehicles 6600, 6700, 6800, information identifying a candidate merge scenario, or both, to the autonomous vehicle operational management controller.

The autonomous vehicle operational management system of the autonomous vehicle 6100 may operate a blocking monitor, such as the blocking monitor 5200 shown in FIG. 5, which may include instantiating the blocking monitor. The blocking monitor may generate probability of availability information indicating respective probabilities of availability, or a corresponding blocking probability, for one or more areas or portions of the vehicle transportation network. For example, the blocking monitor may determine an expected path 6900 for the autonomous vehicle 6100, an expected path 6910 for the first remote vehicle 6600, and a probability of availability for an area or a portion of the vehicle transportation network proximate to a point of convergence between the expected path 6900 for the autonomous vehicle and the expected path 6910 for the first remote vehicle 6600 which may correspond with the merge-intersection 6300.

The autonomous vehicle operational management controller may detect or identify the merge scenario, such as based on the operational environment represented by the operational environment information, which may include the operational environment information output by the merge monitor. For example, the autonomous vehicle operational management controller may identify the candidate merge scenario as a merge scenario.

The autonomous vehicle operational management controller may instantiate one or more merge-SSOCEM instances and may send, or otherwise make available, the operational environment information to the merge-SSOCEM instances, in response to detecting or identifying merge scenario including the first remote vehicle 6600. In addition, or in the alternative, the autonomous vehicle operational management controller may send, or otherwise make available, operational environment information, such as new or updated operational environment information, to one or more previously instantiated, or operating, merge-SSOCEM instances, in response to detecting or identifying merge scenario including the first remote vehicle 6600.

Remote vehicles, such as one or more of the remote vehicles 6600, 6700, 6800, traversing a portion of the vehicle transportation network proximate to the merge-intersection that may affect the operation of the autonomous vehicle traversing the merge-intersection may be identified as merge-relevant remote vehicles. Each merge-SSOCEM instance may correspond with a respective merge-relevant remote vehicle 6600, 6700, 6800.

Instantiating, or updating, a merge-SSOCEM instance may include providing the operational environment information, or a portion thereof, such as the sensor information or the probabilities of availability, to the respective merge-SSOCEM instance, such as by sending the operational environment information, or a portion thereof, to the respective merge-SSOCEM instance, or storing the operational environment information, or a portion thereof, for access by the respective merge-SSOCEM instance. The respective merge-SSOCEM instance may receive, or otherwise access, the operational environment information corresponding to the merge scenario.

The merge-SSOCEM may include a model of the merge scenario, such as a POMDP model of the merge scenario. The POMDP model of the merge scenario may define a set of states (S), a set of actions (A), a set of observations ($\Omega$), a set of state transition probabilities (T), a set of conditional observation probabilities (O), a reward function (R), or a combination thereof, corresponding to the merge scenario, which may be expressed as a tuple <S, A, $\Omega$, T, O, R>. A POMDP model of a distinct merge vehicle operational scenario, may model uncertainty, which may include perceptual uncertainty, behavior uncertainty, or a combination thereof. Modeling perceptual uncertainty may include modeling sensor uncertainty; modeling a probability of false positive remote vehicle identification, such as inaccurately identifying a remote vehicle in the absence of a remote vehicle; modeling a probability of false negative remote vehicle identification, such as inaccurately identifying an absence of a remote vehicle in the presence of a remote vehicle, such as corresponding to an occlusion; or a combination thereof. Modeling behavior uncurtaining may include modeling respective probabilities of remote vehicle actions.

For simplicity and clarity, the model of the merge scenario is described using the first remote vehicle 6600 as the merge-relevant remote vehicle; however, another remove vehicle, such as the second remote vehicle 6700 or the third remote vehicle 6800 may be used as the merge-relevant remote vehicle.

Examples of state factors that may be included in the state space (S) for the POMDP model of the merge scenario may include an immanency state factor ($S_t^m$), an autonomous vehicle relative location state factor ($S_l^{AV}$), an autonomous vehicle pendency state factor ($S_t^{AV}$), an autonomous vehicle relative velocity state factor ($S_v^{RV}$), a remote vehicle relative location state factor ($S_l^{RV}$), a remote vehicle relative location pendency state factor ($S_t^{RV}$, an availability state factor ($S_b^{RV}$), a remote vehicle relative velocity state factor ($S_v^{RV}$), or a combination thereof, which may be expressed as $S = S_t^m \times S_l^{AV} \times S_t^{AV} \times S_v^{AV} \times S_l^{RV} \times S_t^{RV} \times S_b^{RV} \times S_v^{RV}$. Other state factors may be included in the merge POMDP model.

The immanency state factor ($S_t^m$) may indicate a distance, such as a spatial distance, a temporal distance, or a spatiotemporal distance, between a current location of the autonomous vehicle 6100 and a location of the merge-intersection 6300 proximate to the subsequent merged lane 6500, and may have a value from a defined set of values, such as {long, mid, short, now}. For example, an immanency state factor ($S_t^m$) of 'long' may indicate that the distance between the current location of the autonomous vehicle 6100 and the location of the merge-intersection 6300 proximate to the subsequent merged lane 6500 is at least, such as equal to or greater than, a defined long immanency threshold. An immanency state factor ($S_t^m$) of 'mid' may indicate that the distance between the current location of the autonomous vehicle 6100 and the location of the merge-intersection 6300 proximate to the subsequent merged lane 6500 is within, such as less than, the defined long immanency threshold and is at least, such as equal to or greater than, a defined mid immanency threshold. An immanency state factor ($S_t^m$) of 'short' may indicate that the distance between the current location of the autonomous vehicle 6100 and the location of the merge-intersection 6300 proximate to the subsequent merged lane 6500 is within, such as less than, the defined mid immanency threshold and is at least, such as equal to or greater than, a defined short immanency threshold, which may correspond with the autonomous vehicle 6100 approaching the merge-intersection 6300 as shown in FIG. 6. An immanency state factor ($S_t^m$) of 'now' may indicate that the distance between the current location of the autonomous vehicle 6100 and the location of the merge-intersection 6300 proximate to the subsequent merged lane 6500 is within, such as less than, the defined short immanency threshold, which may correspond with the autonomous vehicle 6100 traversing the merge-intersection 6300.

The autonomous vehicle relative location state factor ($S_l^{AV}$) may indicate a location for the autonomous vehicle 6100 relative to a current lane of the autonomous vehicle 6100, which may be the first lane 6210 or the subsequent merged lane 6500, and may have a value from a defined set of values, such as {start, edged, inside, goal}. For example, an autonomous vehicle relative location state factor ($S_l^{AV}$) of 'start' may indicate that the autonomous vehicle 6100 is relatively centered in the first lane 6210 as shown. An autonomous vehicle relative location state factor ($S_l^{AV}$) of 'edged' may indicate that the autonomous vehicle 6100 is relatively near the edge of the current lane 6210 adjacent to the adjacent lane 6400, which may correspond with the center of the subsequent merged lane 6500. An autonomous vehicle relative location state factor ($S_l^{AV}$) of 'inside' may indicate that the autonomous vehicle 6100 is traversing the merge-intersection 6300 in accordance with a merge vehicle control action. An autonomous vehicle relative location state factor ($S_l^{AV}$) of 'goal' may indicate that the autonomous vehicle 6100 is centered in the subsequent merged lane 6500.

The autonomous vehicle pendency state factor ($S_t^{AV}$) may indicate a categorization of a pendency, or temporal period, corresponding to the autonomous vehicle 6100 having a current value of the autonomous vehicle relative location state factor ($S_l^{AV}$), and may have a value from a defined set of values, such as {short, long}. For example, an autonomous vehicle pendency state factor ($S_t^{AV}$) of 'short' may indicate a pendency corresponding to the autonomous vehicle 6100 having a current value of the autonomous vehicle relative location state factor ($S_l^{AV}$) that is within, such as less than, a defined pendency threshold, and an autonomous vehicle pendency state factor ($S_t^{AV}$) of 'long' may indicate a pendency corresponding to the autonomous vehicle 6100 having the current value of the autonomous vehicle relative location state factor ($S_l^{AV}$) that exceeds, such as is equal to or greater than, the defined pendency threshold. The pendency threshold may be defined relative to the current value of the autonomous vehicle relative location state factor ($S_l^{AV}$). For example, a pendency threshold of ten seconds may be defined for the autonomous vehicle relative location state factor ($S_l^{AV}$) of 'start', and a pendency threshold of three seconds may be defined for the autonomous vehicle relative location state factor ($S_l^{AV}$) of 'edged'.

The autonomous vehicle relative velocity state factor ($S_v^{AV}$) may indicate a velocity of the autonomous vehicle 6100 relative to a defined velocity reference, which may be a remote vehicle velocity, a speed limit, or both, and may have a value from a defined set of values, such as {slow, slow-mid, mid, mid-fast, fast}. For example, an autonomous vehicle relative velocity state factor ($S_v^{AV}$) of 'slow' may indicate that the current velocity of the remote vehicle exceeds the current velocity of the autonomous vehicle by an amount that exceeds, such as is equal to or greater than, a defined relative velocity maximum differential threshold. An autonomous vehicle relative velocity state factor ($S_v^{AV}$) of 'slow-mid' may indicate that the current velocity of the remote vehicle exceeds the current velocity of the autonomous vehicle by an amount that is within, such as is less than, the defined relative velocity maximum differential threshold, and exceeds, such as is equal to or greater than, a defined relative velocity minimum differential threshold. An autonomous vehicle relative velocity state factor ($S_v^{AV}$) of 'mid' may indicate that a difference between the current velocity of the remote vehicle and the current velocity of the autonomous vehicle is within, such as is less than, the defined relative velocity minimum differential threshold, which may correspond with equal, or approximately equal, velocities. An autonomous vehicle relative velocity state factor ($S_v^{AV}$) of 'mid-fast' may indicate that the current velocity of the autonomous vehicle exceeds the current velocity of the remote vehicle by an amount that is within, such as is less than, the defined relative velocity maximum differential threshold, and exceeds, such as is equal to or greater than, the defined relative velocity minimum differential threshold. An autonomous vehicle relative velocity state factor ($S_v^{AV}$) of 'fast' may indicate that the current velocity of the autonomous vehicle exceeds the current velocity of the remote vehicle by an amount that exceeds, such as is equal to or greater than, the defined relative velocity maximum differential threshold.

The remote vehicle relative location state factor ($S_l^{RV}$) may indicate a location for a remote vehicle relative a current lane of the remote vehicle and the autonomous vehicle, and may have a value from a defined set of values, such as {empty, behind, at, ahead}. For example, a remote vehicle relative location state factor ($S_l^{RV}$) of 'empty' may indicate that the merge scenario omits a merge-relevant remote vehicle. A remote vehicle relative location state factor ($S_l^{RV}$) of 'behind' may indicate that the merge-relevant remote vehicle is behind the autonomous vehicle 6100, relative to the expected path 6900 of the autonomous vehicle 6100 as shown for the third remote vehicle 6800. A remote vehicle relative location state factor ($S_l^{RV}$) of 'at' may indicate that the merge-relevant remote vehicle is adjacent to the autonomous vehicle 6100 as shown for the first remote vehicle 6600. A remote vehicle relative location state factor ($S_l^{RV}$) of 'ahead' may indicate that the merge-relevant remote vehicle is ahead of the autonomous vehicle 6100, relative to the expected path 6900 of the autonomous vehicle 6100 as shown for the second remote vehicle 6700.

The remote vehicle relative location pendency state factor ($S_t^{RV}$) may indicate a categorization of a pendency, or temporal period, corresponding to the remote vehicle having a current value of the remote vehicle location state factor ($S_l^{RV}$), and may have a value from a defined set of values, such as {short, long}. For example, a remote vehicle relative location pendency state factor ($S_t^{RV}$) of 'short' may indicate a pendency corresponding to the remote vehicle 6600 having a current value of the remote vehicle relative location state factor ($S_l^{RV}$) that is within, such as less than, a defined remote vehicle pendency threshold, and a remote vehicle relative location pendency state factor ($S_t^{RV}$) of 'long' may indicate a pendency corresponding to the remote vehicle 6600 having the current value of the remote vehicle relative location state factor ($S_l^{RV}$) that exceeds, such as is equal to or greater than, the defined remote vehicle pendency threshold. The remote vehicle pendency threshold may be defined relative to the current value of the remote vehicle relative location state factor ($S_l^{RV}$). For example, a remote vehicle pendency threshold of ten seconds may be defined for the remote vehicle relative location state factor ($S_l^{RV}$) of 'behind', and a remote vehicle pendency threshold of three seconds may be defined for the remote vehicle relative location state factor ($S_l^{RV}$) of 'at'.

The availability state factor ($S_b^{RV}$), or a corresponding blocking state factor, may indicate a determination indicating whether the remote vehicle 6600, or the expected path 6910 for the remote vehicle 6100, is currently blocking the autonomous vehicle 6100 from transitioning to the merge lane 6500, and may have a value from a defined set of values, such as {yes, no}. For example, an availability state factor ($S_b^{RV}$) of 'yes' may indicate that a probability that the remote vehicle 6600, or an expected path 6910 for the remote vehicle 6600, is blocking the expected path 6900 of the autonomous vehicle 6100, preventing the autonomous vehicle 6100 from safely merging into the merge lane 6500 at the merge-intersection 6300, is at least, such as is equal to or greater than, a blocking threshold (blocked availability status). An availability state factor ($S_b^{RV}$) of 'no' may indicate a probability that the remote vehicle 6600, or an expected path 6910 for the remote vehicle 6600, is blocking the expected path 6900 of the autonomous vehicle 6100, preventing the autonomous vehicle 6100 from safely merging into the merge lane 6500 at the merge-intersection 6300, is within, such as less than, the blocking threshold (available availability status).

The remote vehicle relative velocity state factor ($S_v^{RV}$) may indicate a velocity of the remote vehicle relative to a defined remote vehicle velocity reference, such as the autonomous vehicle, another remote vehicle, a speed limit, or a combination thereof, and may have a value from a defined set of values, such as {slow, slow-mid, mid, mid-fast, fast}. For example, a remote vehicle relative velocity state factor ($S_v^{RV}$) of 'slow' may indicate that the current velocity of the autonomous vehicle exceeds the current velocity of the remote vehicle by an amount that exceeds, such as is equal to or greater than, the defined relative velocity maximum differential threshold. A remote vehicle relative velocity state factor ($S_v^{RV}$) of 'slow-mid' may indicate that the current velocity of the autonomous vehicle exceeds the current velocity of the remote vehicle by an amount that is within, such as is less than, the defined relative velocity maximum differential threshold, and exceeds, such as is equal to or greater than, a defined relative velocity minimum differential threshold. A remote vehicle relative velocity state factor ($S_v^{RV}$) of 'mid' may indicate that a difference between the current velocity of the remote vehicle and the current velocity of the autonomous vehicle is within, such as is less than, the defined relative velocity minimum differential threshold, which may correspond with equal, or approximately equal, velocities. A remote vehicle relative velocity state factor ($S_v^{RV}$) of 'mid-fast' may indicate that the current velocity of the remote vehicle exceeds the current velocity of the autonomous vehicle by an amount that is within, such as is less than, the defined relative velocity maximum differential threshold, and exceeds, such as is equal to or greater than, the defined relative velocity minimum differential threshold. A remote vehicle relative velocity state factor ($S_v^{RV}$) of 'fast' may indicate that the current velocity of the remote vehicle exceeds the current velocity of the autonomous vehicle by an amount that exceeds, such as is equal to or greater than, the defined relative velocity maximum differential threshold.

Examples of action factors that may be included in the action space (A) for the POMDP model of the merge scenario may include a vehicle control action action factor ($A_j$), a vehicle control action velocity modifier action factor ($A_v$), or both, which may be expressed as $A=A_j \times A_v$. Other action factors may be included in the merge POMDP model.

The vehicle control action action factor ($A_j$) may represent a vehicle control action and may have a value from a defined set of values, such as {maintain, edge, proceed}. For example, a vehicle control action action factor ($A_j$) of 'maintain' may indicate that the autonomous vehicle traverses an immediately subsequent portion of the vehicle transportation network in accordance with a maintain vehicle control action, which may correspond with maintaining a current value of the autonomous vehicle relative location state factor ($S_l^{AV}$). A vehicle control action action factor ($A_j$) of 'edge' may indicate that the autonomous vehicle traverses an immediately subsequent portion of the vehicle transportation network in accordance with an edge vehicle control action. A vehicle control action action factor ($A_j$) of 'proceed' may indicate that the autonomous vehicle traverses an immediately subsequent portion of the vehicle transportation network in accordance with a 'proceed' vehicle control action, which may include merging into the merge lane 6500.

The vehicle control action velocity modifier action factor ($A_v$) may represent a velocity modifier for the vehicle control action indicated by the vehicle control action action factor ($A_j$) and may have a value from a defined set of values, such as {decelerate, maintain, accelerate}. For example, a vehicle control action velocity modifier action factor ($A_v$) of 'decelerate' may indicate that the autonomous vehicle traverses an immediately subsequent portion of the vehicle transportation network in accordance with a vehicle control action corresponding to the vehicle control action action factor ($A_j$) and by decelerating, such as by a defined amount or to a defined velocity, which may be indicated in accordance with the vehicle control action velocity modifier action factor ($A_v$). A vehicle control action velocity modifier action factor ($A_v$) of 'maintain' may indicate that the autonomous vehicle traverses an immediately subsequent portion of the vehicle transportation network in accordance with a vehicle control action corresponding to the vehicle control action action factor ($A_j$) and maintains a current velocity. A vehicle control action velocity modifier action factor ($A_v$) of 'accelerate' may indicate that the autonomous vehicle traverses an immediately subsequent portion of the vehicle transportation network in accordance with a vehicle control action corresponding to the vehicle control action action factor ($A_j$) and by accelerating, such as by a defined amount or to a defined velocity, which may be indicated in accordance with the vehicle control action velocity modifier action factor ($A_v$).

Examples of observation factors that may be included in the observation space ($\Omega$) for the POMDP model of the merge scenario may include an immanency observation factor ($\Omega_t^m$), an autonomous vehicle relative location observation factor ($\Omega_l^{AV}$), an autonomous vehicle relative velocity observation factor ($\Omega_v^{AV}$), a remote vehicle relative location observation factor ($\Omega_l^{RV}$), an availability observation factor ($\Omega_b^{RV}$), a remote vehicle relative velocity observation factor ($\Omega_v^{RV}$), or a combination thereof, which may be expressed as $\Omega = \Omega_t^m \times \Omega_l^{HV} \times \Omega_v^{HV} \times \Omega_l^{RV} \times \Omega_b^{RV} \times \Omega_v^{RV}$. Other observation factors may be included in the merge module POMDP model.

The immanency observation factor ($\Omega_t^m$) may represent a determination whether the immanency for merging from the first lane to the subsequent merged lane passes a defined immanency threshold, and may have a value from a defined set of values, such as {yes, no}. For example, an immanency observation factor ($\Omega_t^m$) value of 'yes' may indicate that the immanency for merging from the first lane to the subsequent merged lane is within, such less than, the defined immanency threshold. An immanency observation factor ($\Omega_t^m$) value of 'no' may indicate that the immanency for merging from the first lane to the subsequent merged lane is at least, such as equal to or greater than, the defined immanency threshold. The immanency observation factor ($\Omega_t^m$) may be associated with the immanency state factor ($S_t^m$).

The autonomous vehicle relative location observation ($\Omega_l^{AV}$) may represent a determination indicating a change of location for the autonomous vehicle and may have a value from a defined set of values, such as {start, edged, inside, goal}. The autonomous vehicle relative location observation ($\Omega_l^{AV}$) may be associated with the autonomous vehicle relative location state factor ($S_l^{AV}$).

The autonomous vehicle relative velocity observation factor ($\Omega_v^{AV}$) may indicate determination of a change of velocity of the autonomous vehicle and may have a value from a defined set of values, such as {decrease, maintain, increase}. The autonomous vehicle relative velocity observation factor ($\Omega_v^{AV}$) may be associated with the autonomous vehicle relative velocity state factor ($S_v^{AV}$).

The remote vehicle location observation factor ($\Omega_l^{RV}$) may represent a determination indicating a change of location for the remote vehicle and may have a value from a defined set of values, such as {empty, behind, at, ahead}. The remote vehicle location observation factor ($\Omega_l^{RV}$) may be associated with the remote vehicle relative location state factor ($S_l^{RV}$).

The availability observation factor ($\Omega_b^{RV}$) may represent a determination indicating a change of whether the remote vehicle 6600, or the expected path 6910 for the remote vehicle 6100, is currently blocking the autonomous vehicle 6100 from transitioning to the merge lane 6500, and may have a value from a defined set of values, such as {yes, no}. The availability observation factor ($\Omega_b^{RV}$) may be associated with the availability state factor ($S_b^{RV}$).

The remote vehicle relative velocity observation factor ($\Omega_v^{RV}$) may indicate determination of a change of velocity of the remote vehicle and may have a value from a defined set of values, such as {decrease, maintain, increase}. The remote vehicle relative velocity observation factor ($\Omega_v^{RV}$) may be associated with the remote vehicle relative velocity state factor ($S_v^{RV}$).

An example of a state transition probability from the state transition probabilities (T) for the POMDP model of the merge scenario is a probability that the remote vehicle 6600 decelerates such that a portion of the vehicle transportation network ahead of, or in front of, the remote vehicle 6600, relative to the trajectory of the remote vehicle 6600, is available for the autonomous vehicle 6100 to traverse to transition to the subsequent merged lane 6500. Another example of a state transition probability for the POMDP model of the merge scenario is a probability that the remote vehicle 6600 accelerates such that a portion of the vehicle transportation network subsequent to, or behind, the remote vehicle 6600, relative to the trajectory of the remote vehicle 6600, is available for the autonomous vehicle 6100 to traverse to transition to the subsequent merged lane 6500. Another example of a state transition probability for the POMDP model of the merge scenario is a probability that the traversal of the vehicle transportation network by the autonomous vehicle 6100 is affected by a forward obstruction (not expressly shown), such as a remote vehicle along the expected path for the autonomous vehicle and having a velocity that is within, such as less than, the velocity of the autonomous vehicle. Another example of a state transition probability for the POMDP model of the merge scenario is a probability that the remote vehicle 6600 merges into the subsequent merge lane 6500 ahead of, or in front of, the autonomous vehicle 6100. Another example of a state transition probability for the POMDP model of the merge scenario is a probability that the immanency for merging from the first lane to the subsequent merged lane passes a defined immanency threshold. Another example of a state transition probability for the POMDP model of the merge scenario is a probability that a remote vehicle (not expressly shown) ahead of the autonomous vehicle 6100 in the adjacent lane decelerates such that a portion of the vehicle transportation network previously available for traversal by the autonomous vehicle 6100 is unavailable for traversal by the autonomous vehicle 6100.

An example of a conditional observation probability from the conditional observation probabilities (O) is a probability of uncertainty corresponding to the availability observation factor ($\Omega_b^{RV}$). Another example of a conditional observation probability is a probability that a remote vehicle is occluded or otherwise undetected, such as due to sensor limitations. Another example of a conditional observation probability is a probability of accuracy for a measurement off the location of the remote vehicle.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→□.

Instantiating the merge-SSOCEM instance may include identifying a solution or policy for a model of the merge vehicle operational scenario from the merge-SSOCEM. Identifying the solution or policy for the model of the merge vehicle operational scenario from the merge-SSOCEM may include solving the merge-SSOCEM model. Instantiating the merge-SSOCEM instance may include instantiating an instance of the solution or policy.

The merge-SSOCEM solution instance may generate a candidate vehicle control action, such as 'maintain', 'edge', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated merge-SSOCEM instances and may identify a vehicle control action based on the received candidate vehicle control actions for controlling the autonomous vehicle 6100 at the corresponding temporal location and may control the autonomous vehicle to traverse the vehicle transportation network, or a portion thereof, in accordance with the identified vehicle control action.

The autonomous vehicle operational management controller may determine whether one or more of the detected vehicle operational scenarios has expired and, in response to determining that a merge vehicle operational scenario has expired, may uninstantiate corresponding merge-SSOCEM instances.

FIG. 7 is a diagram of another example of a merge scene 7000 including a merge scenario in accordance with embodiments of this disclosure. Autonomous vehicle operational management may include an autonomous vehicle 7100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 5000 shown in FIG. 5, including a merge-SSOCEM, such as the merge-SSOCEM 5410 shown in FIG. 5, which may include a model of an autonomous vehicle operational control scenario that includes the autonomous vehicle 7100 traversing a portion of the vehicle transportation network along a first road 7200 in a first lane 7210 approaching a merge-intersection 7300 (merge scenario). The merge scene 7000 shown in FIG. 7 may be similar to the merge scene 6000 shown in FIG. 6, except as described herein or otherwise clear from context.

The portion of the vehicle transportation network corresponding to the merge scene 7000 shown in FIG. 7 includes the autonomous vehicle 7100 traversing northward along a road segment in the first lane 7210 of the first road 7200, adjacent to a second lane 7220 of the first road 7200, approaching the merge-intersection 7300. The first lane 7210 merges into the second lane 7220 and ends at the merge-intersection 7300. The second lane 7220 becomes the subsequent merged lane 7400 of the first road 7200 at the merge-intersection 7300. Although the first lane 7210, the second lane 7220, and the subsequent merged lane 7400 are shown separately, respective portions of the first lane 7210, the second lane 7220, and subsequent merged lane 7400 may overlap in the merge-intersection 7300. A first remote vehicle 7500 is traversing the second lane 7220, approaching the merge-intersection 7300. A second remote vehicle 7600 is traversing the subsequent merged lane 7400 ahead of the autonomous vehicle 7100. A third remote vehicle 7700 is traversing the first lane 7210 behind the autonomous vehicle 7100.

Although the autonomous vehicle 7100 is shown in the first lane 7210, the autonomous vehicle may traverse the second lane 7220 approaching the merge-intersection 7300 (not shown). Although the first remote vehicle 7500 is shown in the second lane 7220 in FIG. 7, the first remote vehicle may traverse the first lane 7210 approaching the merge-intersection 7300 (not shown).

FIG. 8 is a diagram of another example of a merge scene 8000 including a merge scenario in accordance with embodiments of this disclosure. Autonomous vehicle operational management may include an autonomous vehicle 8100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 5000 shown in FIG. 5, including a merge-SSOCEM, such as the merge-SSOCEM 5410 shown in FIG. 5, which may include a model of an autonomous vehicle operational control scenario that includes the autonomous vehicle 8100 traversing a portion of the vehicle transportation network along a first road 8200 in a first lane 8210 approaching a merge-intersection 8300 (merge scenario). The merge scene 8000 shown in FIG. 8 may be similar to the merge scene 6000 shown in FIG. 6, except as described herein or otherwise clear from context.

The portion of the vehicle transportation network corresponding to the merge scene 8000 shown in FIG. 8 includes the autonomous vehicle 8100 traversing northward along a road segment in the first lane 8210 of the first road 8200, approaching the merge-intersection 8300. A second road 8400, including a second lane 8410, merges with the first road 8100 at the merge-intersection 8300. The first lane 8210 and the second lane 8410 merge at the merge-intersection 8300 to form a subsequent merged lane 8500 of the first road 8200. Although the first lane 8210, the second lane 8400, and the merge lane 8500 are shown separately, respective portions of the first lane 8210, the second lane 8400, and the merge lane 8500 may overlap in the merge-intersection 8300. A first remote vehicle 8600 is traversing the second lane 8410, approaching the merge-intersection 8300. A second remote vehicle 8700 is traversing the subsequent merged lane 8500 ahead of the autonomous vehicle 8100. A third remote vehicle 8800 is traversing the first lane 8210 behind the autonomous vehicle 8100.

Although the autonomous vehicle 8100 is shown in the first lane 8210, the autonomous vehicle may traverse the second lane 8410 approaching the merge-intersection 8300 (not shown). Although the first remote vehicle 8600 is shown in the second lane 8410 in FIG. 8, the first remote vehicle may traverse the first lane 8210 approaching the merge-intersection 8300 (not shown).

Although not shown in FIGS. 6-8, the road of the merged lane may include an adjacent lane, adjacent to the merged lane distal from the second lane, in the direction of travel of the first lane, and the autonomous vehicle may perform a lane-change vehicle control action to the adjacent lane.

Figure 9:
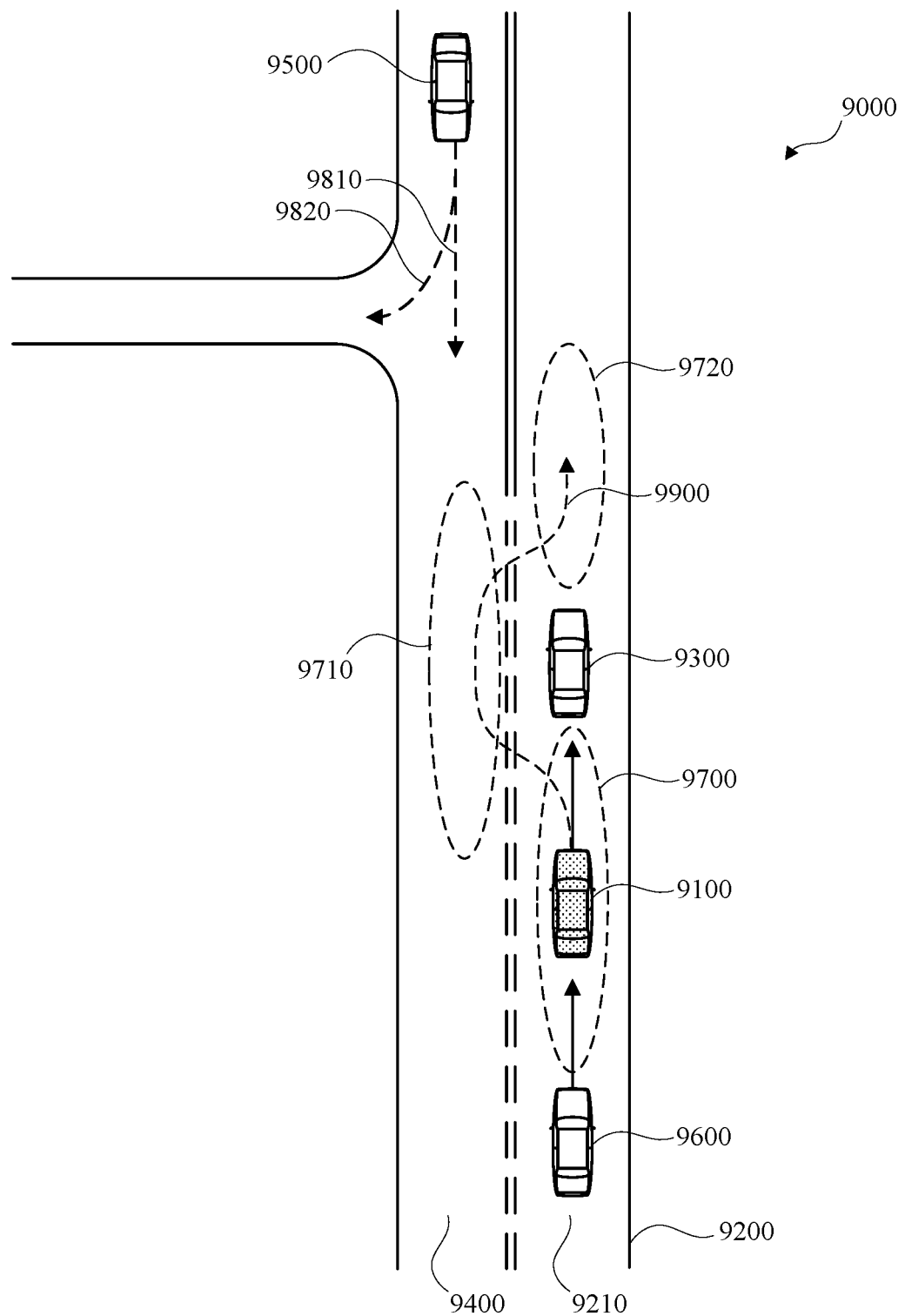
FIG. 9 is a diagram of an example of a pass-obstruction scene in accordance with embodiments of this disclosure.

FIG. 9 is a diagram of an example of a pass-obstruction scene 9000 including a pass-obstruction scenario in accordance with embodiments of this disclosure. Autonomous vehicle operational management may include an autonomous vehicle 9100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 5000 shown in FIG. 5, including a pass-obstruction-SSOCEM, such as the pass-obstruction-SSOCEM 5420 shown in FIG. 5, which may include a model of an autonomous vehicle operational control scenario that includes the autonomous vehicle 9100 traversing a portion of the vehicle transportation network along a first road 9200 in a first lane 9210 approaching an obstruction 9300 (pass-obstruction scenario). For simplicity and clarity, the portion of the vehicle transportation network corresponding to the pass-obstruction scene 9000 shown in FIG. 9 is oriented with north at the top and east at the right. Pass-obstruction scenarios may be similar to lane-change scenarios or merge scenarios, except as described herein or otherwise clear from context. For example, a pass-obstruction scenario includes traversing a portion of an oncoming lane of the vehicle transportation network.

The portion of the vehicle transportation network corresponding to the pass-obstruction scene 9000 shown in FIG. 9 includes the autonomous vehicle 9100 traversing northward along a road segment in the first lane 9210 of the first road 9200, adjacent to an oncoming lane 9400, approaching the obstruction 9300. The obstruction 9300 may be, for example, a slow moving, or stationary, remote vehicle (as shown), or any other object or obstacle obstructing the first lane 9210, such as a construction site, pedestrians, a fallen tree, or the like. An oncoming remote vehicle 9500 is traversing the oncoming lane 9400. A trailing remote vehicle 9600 is traversing the first lane 9210 behind the autonomous vehicle 9100. Portions of the vehicle transportation network are indicated using broken line ovals, such as a current portion 9700 of the current lane 9200, an oncoming portion 9710 of the oncoming lane 9400, and a goal portion 9720 of the current lane 9200. An expected path 9800 for the autonomous vehicle 9100 is indicated by a broken directional line. Expected paths 9810, 9820 for the oncoming remote vehicle are indicated using broken directional lines. Although the obstruction 9300 is shown as stationary, the obstruction 9300 may be in motion and the location of the current portion 9700, the oncoming portion 9710, and the goal portion 9720 may be relative to the autonomous vehicle 9100 and the obstruction 9300.

The autonomous vehicle operational management system may operate continuously or periodically, such as at each temporal location in a sequence of temporal locations. A first, sequentially earliest, temporal location from the sequence of temporal locations may correspond with operating the autonomous vehicle, which may include traversing a portion of the vehicle transportation network by the autonomous vehicle or receiving or identifying an identified route for traversing the vehicle transportation network by the autonomous vehicle. For simplicity and clarity, the respective geospatial location of the autonomous vehicle 9100, the obstruction 9300, the oncoming remote vehicle 9500, and the trailing remote vehicle 9600 is shown in accordance with a temporal location from the sequence of temporal locations corresponding to a spatial location in the vehicle transportation network as shown. Although described with reference to a sequence of temporal locations for simplicity and clarity, each unit of the autonomous vehicle operational management system may operate at any frequency, the operation of respective units may be synchronized or unsynchronized, and operations may be performed concurrently with one or more portions of one or more temporal locations. For simplicity and clarity, respective descriptions of one or more temporal locations, such as temporal locations between the temporal locations described herein, may be omitted from this disclosure.

The autonomous vehicle operational management system of the autonomous vehicle 9100 may operate a forward obstruction monitor, such as the forward obstruction monitor 4260 shown in FIG. 4, which may include instantiating the forward obstruction monitor. The forward obstruction monitor may process or evaluate vehicle transportation network data, such as map data, sensor data, or a combination thereof, representing a portion of the vehicle transportation network, such as a portion corresponding to an identified route for the autonomous vehicle 9100, a portion spatially proximate to the autonomous vehicle 9100, or an expected path for the autonomous vehicle 9100, or a combination thereof. For example, the identified route for the autonomous vehicle 9100, an expected path for the autonomous vehicle 9100, or both, may include, or may be proximate to, the obstruction 9300 and the forward obstruction monitor may identify a candidate pass-obstruction scenario corresponding to the autonomous vehicle 9100 traversing the portion of the vehicle transportation network approaching the obstruction 9300. In another example, the sensors of the autonomous vehicle 9100 may detect information corresponding to the operational environment of the autonomous vehicle 9100, such as information indicating that the vehicle transportation network along the expected path for the autonomous vehicle includes the obstruction 9300, information corresponding to the obstruction 9300, information corresponding to the oncoming remote vehicle 9500, information corresponding to the trailing remote vehicle 9600, or a combination thereof.

The forward obstruction monitor may identify or generate operational environment information representing the operational environment, or an aspect thereof, of the autonomous vehicle 9100, which may include associating the sensor information with the obstruction 9300, the oncoming remote vehicle 9500, the trailing remote vehicle 9600, or a combination thereof, and may output the operational environment information, which may include information representing the obstruction 9300, the oncoming remote vehicle 9500, the trailing remote vehicle 9600, or a combination thereof, information identifying a candidate pass-obstruction scenario, or both, to the autonomous vehicle operational management controller.

The autonomous vehicle operational management system of the autonomous vehicle 9100 may operate a blocking monitor, such as the blocking monitor 4210 shown in FIG. 4, which may include instantiating the blocking monitor. The blocking monitor may generate probability of availability information indicating respective probabilities of availability, or a corresponding blocking probability, for one or more areas or portions of the vehicle transportation network, such as the current portion 9700, the oncoming portion 9710, and the goal portion 9720.

The autonomous vehicle operational management controller may detect or identify the pass-obstruction scenario, such as based on the operational environment represented by the operational environment information, which may include the operational environment information output by the forward obstruction monitor. For example, the autonomous vehicle operational management controller may identify the candidate pass-obstruction scenario as a pass-obstruction scenario.

The autonomous vehicle operational management controller may instantiate one or more pass-obstruction-SSOCEM instances and may send, or otherwise make available, the operational environment information to the pass-obstruction-SSOCEM instances, in response to detecting or identifying the pass-obstruction scenario. In addition, or in the alternative, the autonomous vehicle operational management controller may send, or otherwise make available, operational environment information, such as new or updated operational environment information, to one or more previously instantiated, or operating, pass-obstruction-SSOCEM instances, in response to detecting or identifying pass-obstruction scenario.

Instantiating, or updating, a pass-obstruction-SSOCEM instance may include providing the operational environment information, or a portion thereof, such as the sensor information or the probabilities of availability, to the respective pass-obstruction-SSOCEM instance, such as by sending the operational environment information, or a portion thereof, to the respective pass-obstruction-SSOCEM instance, or storing the operational environment information, or a portion thereof, for access by the respective pass-obstruction-SSOCEM instance. The respective pass-obstruction-SSOCEM instance may receive, or otherwise access, the operational environment information corresponding to the pass-obstruction scenario.

The pass-obstruction-SSOCEM may include a model of the pass-obstruction scenario, such as a POMDP model of the pass-obstruction scenario. The POMDP model of the pass-obstruction scenario may define a set of states (S), a set of actions (A), a set of observations ($\Omega$), a set of state transition probabilities (T), a set of conditional observation probabilities (O), a reward function (R), or a combination thereof, corresponding to the pass-obstruction scenario, which may be expressed as a tuple <S, A, $\Omega$, T, O, R>. A POMDP model of a distinct pass-obstruction vehicle operational scenario, may model uncertainty, which may include perceptual uncertainty, behavior uncertainty, or a combination thereof. Modeling perceptual uncertainty may include modeling sensor uncertainty; modeling a probability of false positive remote vehicle identification, such as inaccurately identifying a remote vehicle in the absence of a remote vehicle; modeling a probability of false negative remote vehicle identification, such as inaccurately identifying an absence of a remote vehicle in the presence of a remote vehicle, such as corresponding to an occlusion; or a combination thereof. Modeling behavior uncertaining may include modeling respective probabilities of remote vehicle actions, such as actions of the oncoming remote vehicle 9500 or actions of the trailing remote vehicle 9600.

Examples of state factors that may be included in the state space (S) for the POMDP model of the pass-obstruction scenario may include an autonomous vehicle relative location state factor ($S_l^{AV}$), an autonomous vehicle pendency state factor ($S_t^{AV}$), a forward obstruction state factor ($S_s^{FO}$), a backward availability state factor ($S_s^{TV}$), an oncoming remote vehicle distance state factor ($S_l^{OV}$), an oncoming remote vehicle location pendency state factor ($S_t^{OV}$), an oncoming availability state factor ($S_b^{OV}$), or a combination thereof, which may be expressed as $S=S_l^{AV} \times S_t^{AV} \times S_s^{FO} \times S_s^{TV} \times S_l^{OV} \times S_t^{OV} \times S_b^{OV}$. Other state factors may be included in the pass-obstruction POMDP model.

The autonomous vehicle relative location state factor ($S_l^{AV}$) may indicate a location for the autonomous vehicle 9100 relative to a current lane of the autonomous vehicle 9100, which may be the first lane 9210 or the oncoming lane 9400, and may have a value from a defined set of values, such as {start, at, edged, inside-start, inside-mid, inside-end, goal}. For example, an autonomous vehicle relative location state factor ($S_l^{AV}$) of 'start' may indicate that the autonomous vehicle 9100 is relatively centered in the first lane 9210, as shown, prior to approaching the obstruction 9300. An autonomous vehicle relative location state factor ($S_l^{AV}$) of 'at' may indicate that the autonomous vehicle 9100 is relatively centered in the first lane 9210, as shown, and is approaching the obstruction 9300. An autonomous vehicle relative location state factor ($S_l^{AV}$) of 'edged' may indicate that the autonomous vehicle 9100 is relatively near the edge of the current lane 9210 adjacent to the oncoming lane 9400. An autonomous vehicle relative location state factor ($S_l^{AV}$) of 'inside-start' may indicate that the autonomous vehicle 9100 is traversing the oncoming portion 9710 relatively near the current portion 9700. An autonomous vehicle relative location state factor ($S_l^{AV}$) of 'inside-mid' may indicate that the autonomous vehicle 9100 is traversing the oncoming portion 9710 equidistant, or approximately equidistant, from the current portion 9700 and the goal portion 9720, such as adjacent to the obstruction 9300. An autonomous vehicle relative location state factor ($S_l^{AV}$) of 'inside-end' may indicate that the autonomous vehicle 9100 is traversing the oncoming portion 9710 relatively near the goal portion 9720. An autonomous vehicle relative location state factor ($S_l^{AV}$) of 'goal' may indicate that the autonomous vehicle 9100 is centered in the goal portion 9720.

The autonomous vehicle pendency state factor ($S_t^{AV}$) may indicate a categorization of a pendency, or temporal period, corresponding to the autonomous vehicle 9100 having a current value of the autonomous vehicle relative location state factor ($S_l^{AV}$), and may have a value from a defined set of values, such as {short, long}. For example, an autonomous vehicle pendency state factor ($S_t^{AV}$) of 'short' may indicate a pendency corresponding to the autonomous vehicle 9100 having a current value of the autonomous vehicle relative location state factor ($S_l^{AV}$) that is within, such as less than, a defined pendency threshold, and an autonomous vehicle pendency state factor ($S_t^{AV}$) of 'long' may indicate a pendency corresponding to the autonomous vehicle 9100 having the current value of the autonomous vehicle relative location state factor ($S_l^{AV}$) that exceeds, such as is equal to or greater than, the defined pendency threshold. The pendency threshold may be defined relative to the current value of the autonomous vehicle relative location state factor ($S_l^{AV}$). For example, a pendency threshold of ten seconds may be defined for the autonomous vehicle relative location state factor ($S_l^{AV}$) of 'start', and a pendency threshold of three seconds may be defined for the autonomous vehicle relative location state factor ($S_l^{AV}$) of 'edged'.

The forward obstruction state factor ($S_s^{FO}$) may represent a current status of the obstruction 9300 ahead of the autonomous vehicle in the current lane, relative to an expected path of the autonomous vehicle, and may have a value from a defined set of values, such as {stopped, slow, normal, blocked, pedestrians}.

The backward availability state factor ($S_s^{TV}$) may represent an availability status of the current portion 9700, and may have a value from a defined set of values, such as {empty, open, closed}. For example, a backward availability state factor ($S_s^{TV}$) value of 'empty' may indicate that the current portion 9700 is empty, or available, and that the pass-obstruction scenario omits a trailing remote vehicle. A backward availability state factor ($S_s^{TV}$) value of 'open' may indicate that the current portion 9700 is available. A backward availability state factor ($S_s^{TV}$) value of 'closed' may indicate that the current portion 9700 is blocked, such as by the trailing remote vehicle 9600.

The oncoming remote vehicle distance state factor ($S_l^{OV}$) may represent a distance of the oncoming remote vehicle 9500 from the autonomous vehicle 9100, and may have a value from a defined set of values, such as {empty, far, mid, close, at}. For example, an oncoming remote vehicle distance state factor ($S_l^{OV}$) value of 'empty' may indicate that the pass-obstruction scenario omits an oncoming remote vehicle. An oncoming remote vehicle distance state factor ($S_l^{OV}$) value of 'far' may indicate that a distance between the oncoming remote vehicle 9500 and the autonomous vehicle 9100 exceeds a defined maximum threshold. An oncoming remote vehicle distance state factor ($S_l^{OV}$) value of 'mid' may indicate a distance between the oncoming remote vehicle 9500 and the autonomous vehicle 9100 is within the defined maximum threshold and exceeds a defined minimum threshold. An oncoming remote vehicle distance state factor ($S_l^{OV}$) value of 'close' may indicate a distance between the oncoming remote vehicle 9500 and the autonomous vehicle 9100 is within the defined minimum threshold. An oncoming remote vehicle distance state factor ($S_l^{OV}$) value of 'at' may indicate the oncoming remote vehicle 9500 is adjacent to the autonomous vehicle 9100.

The oncoming remote vehicle location pendency state factor ($S_t^{OV}$) may represent a categorization of a pendency, or temporal period, corresponding to corresponding to the oncoming remote vehicle 9500 having a current value of the oncoming remote vehicle distance state factor ($S_l^{OV}$), and may have a value from a defined set of values, such as {short, long}. For example, an oncoming remote vehicle location pendency state factor ($S_t^{OV}$) of 'short' may indicate a pendency of a current location of the oncoming remote vehicle 9500 that is within, such as less than, a defined oncoming remote vehicle pendency threshold. An oncoming remote vehicle location pendency state factor ($S_t^{OV}$) of 'long' may indicate a pendency corresponding to the oncoming remote vehicle 9500 having current location that exceeds, such as is equal to or greater than, the defined oncoming remote vehicle pendency threshold.

The oncoming availability state factor ($S_b^{OV}$) may represent an availability state of the oncoming portion 9710, corresponding to traversing the vehicle transportation network by passing the obstruction in the current lane by traversing the oncoming portion 9710 of the oncoming lane, and may have a value from a defined set of values, such as {yes, no}. For example, an oncoming availability state factor ($S_b^{OV}$) of 'yes' may indicate that a probability that the oncoming remote vehicle 9500, or an expected path 9810 for the oncoming remote vehicle 9500, is blocking the expected path 9900 of the autonomous vehicle 9100, preventing the autonomous vehicle 9100 from safely passing the obstruction 9300 by traversing the oncoming portion 9710, is at least, such as is equal to or greater than, a blocking threshold (blocked availability status). An oncoming availability state factor ($S_b^{OV}$) of 'no' may indicate a probability that the oncoming remote vehicle 9500, or an expected path 9820 for the oncoming remote vehicle 9500, is blocking the expected path 9900 of the autonomous vehicle 9100, preventing the autonomous vehicle 9100 from safely passing the obstruction 9300 by traversing the oncoming portion 9710, is within, such as less than, the blocking threshold (available availability status).

The action space (A) may include a vehicle control action action factor ($A_l$). Other action factors may be included in the pass-obstruction module POMDP model. The vehicle control action action factor ($A_l$) may represent a vehicle control action and may have a value from a defined set of values, such as {edge, proceed, recover, protect}. For example, a vehicle control action action factor ($A_l$) of 'edge' may indicate that the autonomous vehicle 9100 traverses an immediately subsequent portion of the vehicle transportation network in accordance with an edge vehicle control action, such as by approaching the edge of the first lane 9200 adjacent to the oncoming lane 9400 or by partially entering the oncoming lane 9400, such as by a few inches such that a portion of the autonomous vehicle 9100 remains in the first lane 9200. Edging may reduce uncertainty, such as by altering the relative orientation of obstructions. A vehicle control action action factor ($A_l$) of 'proceed' may indicate that the autonomous vehicle 9100 traverses an immediately subsequent portion of the vehicle transportation network in accordance with a 'proceed' vehicle control action, which may include traversing from the current portion 9700 through the oncoming portion 9710 and subsequently to the goal portion 9720, which may include accelerating. A vehicle control action action factor ($A_l$) of 'recover' may indicate that the autonomous vehicle 9100 rapidly returns to the current portion 9700. For example, the autonomous vehicle 9100 may partially or completely enter the oncoming lane 9400, subsequently determine that a probability of safely traversing through the oncoming portion 9710 to the goal portion 9720 is within a minimum safety threshold, and may traverse the vehicle transportation network in accordance with a 'recover' vehicle control action by returning to the current portion 9700. A vehicle control action action factor ($A_l$) of 'protect' may indicate that the autonomous vehicle 9100 performs a safety or collision avoidance vehicle control action, such as by rapidly decelerating and entering a margin (not shown) at the side of the oncoming lane 9400 distal from the first lane 9100. For example, the autonomous vehicle 9100 may partially traverse the oncoming portion 9710 and may determine that an expected path 9810 for the oncoming remote vehicle 9500 is convergent with a current expected path 9900 for the autonomous vehicle 9100, a probability of safely traversing through the oncoming portion 9710 to the goal portion 9720 is within a minimum safety threshold, and a probability of recovery by returning to the current portion 9700 is within the minimum safety threshold, and the autonomous vehicle 9100 may traverse the vehicle transportation network in accordance with a 'protect' vehicle control action to minimize a probability of collision.

Examples of observation factors that may be included in the observation space (Ω) for the POMDP model of the pass-obstruction scenario may include an autonomous vehicle relative location observation factor ($\Omega_l^{AV}$), a forward obstruction observation factor ($\Omega_s^{FO}$), a backward availability observation factor ($\Omega_s^{TV}$), an oncoming remote vehicle relative location observation factor ($\Omega_l^{OV}$), an oncoming availability observation factor ($\Omega_s^{FO}$), or a combination thereof, which may be expressed as $\Omega = \Omega_l^{AV} \times \Omega_s^{FO} \times \Omega_s^{TV} \times \Omega_l^{OV} \times \Omega_b^{OV}$. Other observation factors may be included in the pass-obstruction module POMDP model.

The autonomous vehicle relative location observation factor ($\Omega_l^{AV}$) may represent a determination indicating a change of location for the autonomous vehicle and may have a value from a defined set of values, such as {yes, no}. For example, an autonomous vehicle relative location observation factor ($\Omega_l^{AV}$) of 'yes' may indicate that a location for the autonomous vehicle changed in from a prior location for the autonomous vehicle, such as in response to traversing a portion of the vehicle transportation network in accordance with a vehicle control action. An autonomous vehicle relative location observation factor ($\Omega_l^{AV}$) of 'no' may indicate that a location for the autonomous vehicle corresponds with a prior location for the autonomous vehicle. The autonomous vehicle relative location observation ($\Omega_l^{AV}$) may be associated with the autonomous vehicle relative location state factor ($S_l^{AV}$).

The forward obstruction observation factor ($\Omega_s^{FO}$) may indicate a status of the obstruction 9300 and may have a value from a defined set of values, such as {stopped, slow, normal}. The forward obstruction observation factor ($\Omega_s^{FO}$) may be associated with the forward obstruction state factor (SP).

The backward availability observation factor ($\Omega_s^{TV}$) may represent an availability status of the current portion 9700, and may have a value from a defined set of values, such as {empty, open, closed}. The backward availability observation factor ($\Omega_s^{TV}$) may be associated with the backward availability state factor ($S_s^{TV}$).

The oncoming remote vehicle relative location observation factor ($\Omega_l^{OV}$) may represent a determination indicating a change of location for the remote vehicle and may have a value from a defined set of values, such as {empty, behind, at, ahead}. The oncoming remote vehicle relative location observation factor ($\Omega_l^{OV}$) may be associated with the oncoming remote vehicle location pendency state factor ($S_l^{OV}$).

The oncoming availability observation factor ($\Omega_b^{OV}$) may represent an availability state of the oncoming portion 9710, corresponding to traversing the vehicle transportation network by passing the obstruction in the current lane by traversing the oncoming portion 9710 of the oncoming lane, and may have a value from a defined set of values, such as {yes, no}. The oncoming availability observation factor ($\Omega_b^{OV}$) may be associated with the oncoming availability state factor ($S_b^{OV}$).

An example of a state transition probability from the state transition probabilities (T) for the POMDP model of the pass-obstruction scenario is a probability that an expected path 9820 for the oncoming remote vehicle 9500 omits the oncoming portion 9710 of the oncoming lane 9400 and a current location for the oncoming remote vehicle 9500 is blocking other oncoming vehicles (not shown) from traversing the oncoming portion 9710 of the oncoming lane 9400.

Another example of a state transition probability from the state transition probabilities (T) for the POMDP model of the pass-obstruction scenario is a probability that a previously undetected oncoming vehicle (not shown) is detected approaching the oncoming portion 9710 of the oncoming lane 9400. Another example of a state transition probability from the state transition probabilities (T) for the POMDP model of the pass-obstruction scenario is a probability that the trailing remote vehicle 9600 traverses the current portion 9700 of the current lane 9200 blocking the autonomous vehicle 9100 from recovering to the current portion 9700 of the current lane 9200. Another example of a state transition probability from the state transition probabilities (T) for the POMDP model of the pass-obstruction scenario is a probability of change of the forward obstruction state factor) ($S_s^{FO}$), such as in response to the forward obstruction 9300 accelerating.

An example of a conditional observation probability from the conditional observation probabilities (O) is a probability of uncertainty of sensor data corresponding to the relative distance of the oncoming remote vehicle 9500 from the autonomous vehicle 9100. Another example of a conditional observation probability is a probability of uncertainty corresponding to the availability observation factor ($\Omega_b^{RV}$). Another example of a conditional observation probability is a probability of a change of occlusion uncertainty corresponding to traversing a portion of the vehicle transportation network in accordance with an 'edge' vehicle control action to alter the relative orientation of occlusions and external objects. Another example of a conditional observation probability is a probability of uncertainty corresponding to accurately determining the forward obstruction state factor ($S_s^{FO}$).

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→□.

Instantiating the pass-obstruction-SSOCEM instance may include identifying a solution or policy for a model of the pass-obstruction vehicle operational scenario from the pass-obstruction-SSOCEM. Identifying the solution or policy for the model of the pass-obstruction vehicle operational scenario from the pass-obstruction-SSOCEM may include solving the pass-obstruction-SSOCEM model. Instantiating the pass-obstruction-SSOCEM instance may include instantiating an instance of the solution or policy.

The pass-obstruction-SSOCEM solution instance may generate a candidate vehicle control action, such as 'maintain', 'edge', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated pass-obstruction-SSOCEM instances and may identify a vehicle control action based on the received candidate vehicle control actions for controlling the autonomous vehicle 9100 at the corresponding temporal location and may control the autonomous vehicle to traverse the vehicle transportation network, or a portion thereof, in accordance with the identified vehicle control action.

The autonomous vehicle operational management controller may determine whether one or more of the detected vehicle operational scenarios has expired and, in response to determining that a vehicle operational scenario has expired, may uninstantiate corresponding pass-obstruction-SSOCEM instances.

In some implementations, traversing the vehicle transportation network may include in response to receiving, from an operational environment monitor of the vehicle, operational environment information identifying the vehicle operational scenario, instantiating the scenario-specific operational control evaluation module instance.

In some implementations, the vehicle operational scenario may be the merge vehicle operational scenario, traversing the portion of the vehicle transportation network in accordance with the candidate vehicle control action may include merging from a first lane in the vehicle transportation network to a subsequent merged lane of the vehicle transportation network, wherein the first lane and a second lane of the vehicle transportation network merge to form the subsequent merged lane.

In some implementations, traversing the vehicle transportation network may include operating the operational environment monitor to identify the vehicle operational scenario in response to a determination that the first lane and the second lane merge to form the subsequent merged lane.

In some implementations, the scenario-specific operational control evaluation model may include an immanency state factor representing a distance between a current location of the autonomous vehicle and a location of the merge-intersection proximate to the subsequent merged lane.

In some implementations, the scenario-specific operational control evaluation model may include an autonomous vehicle relative location state factor representing a location of the autonomous vehicle relative to a current lane of the autonomous vehicle, wherein the current lane is the first lane or the subsequent merged lane.

In some implementations, the scenario-specific operational control evaluation model may include an autonomous vehicle pendency state factor representing a pendency corresponding to the autonomous vehicle having a current value of the autonomous vehicle relative location state factor.

In some implementations, the scenario-specific operational control evaluation model may include an autonomous vehicle relative velocity state factor representing a relative velocity of the autonomous vehicle relative to a defined velocity reference.

In some implementations, the scenario-specific operational control evaluation model may include an availability state factor representing an availability status of a portion of the vehicle transportation network corresponding to traversing the vehicle transportation network by merging from the first lane to the subsequent merged lane.

In some implementations, the scenario-specific operational control evaluation model may include a vehicle control action action factor representing a vehicle control action.

In some implementations, the scenario-specific operational control evaluation model may include a vehicle control action velocity modifier action factor representing a velocity modifier for the vehicle control action.

In some implementations, the scenario-specific operational control evaluation model may include an immanency observation factor representing a determination whether the immanency for merging from the first lane to the subsequent merged lane passes a defined immanency threshold.

In some implementations, the scenario-specific operational control evaluation model may include an autonomous vehicle relative location observation factor representing a determination indicating a change of location for the autonomous vehicle.

In some implementations, the scenario-specific operational control evaluation model may include an autonomous vehicle relative velocity observation factor representing a determination indicating a change of velocity for the autonomous vehicle.

In some implementations, the scenario-specific operational control evaluation model may include the operational environment information may indicate a remote vehicle in the vehicle operational scenario, and the scenario-specific operational control evaluation model may include a remote vehicle relative location state factor representing a location of the remote vehicle relative to a current remote vehicle lane of the remote vehicle and the autonomous vehicle, wherein the current remote vehicle lane is the first lane, the second lane, or the subsequent merged lane.

The scenario-specific operational control evaluation model may include a remote vehicle relative location pendency state factor representing a pendency corresponding to the remote vehicle having a current value of the remote vehicle relative location state factor.

The scenario-specific operational control evaluation model may include a remote vehicle relative velocity state factor representing a relative velocity of the remote vehicle relative to a defined remote vehicle velocity reference.

The scenario-specific operational control evaluation model may include a remote vehicle relative location observation factor representing a determination indicating a change of location for the remote vehicle.

The scenario-specific operational control evaluation model may include an availability observation factor representing a determination indicating a change of availability for the portion of the vehicle transportation network corresponding to traversing the vehicle transportation network by merging from the first lane to the subsequent merged lane.

The scenario-specific operational control evaluation model may include a remote vehicle relative velocity observation factor representing a determination indicating a change of velocity for the remote vehicle.

The scenario-specific operational control evaluation model may include a remote vehicle acquiescence state transition probability indicating a probability that the remote vehicle operates such that the portion of the vehicle transportation network corresponding to traversing the vehicle transportation network by merging from the first lane to the subsequent merged lane is available.

The scenario-specific operational control evaluation model may include a remote vehicle advancing state transition probability indicating a probability that the remote vehicle passes the autonomous vehicle in the second lane.

The scenario-specific operational control evaluation model may include an obstructed current lane state transition probability indicating a probability that the current lane of the autonomous vehicle is obstructed along an expected path for the autonomous vehicle.

The scenario-specific operational control evaluation model may include a remote vehicle forward merge state transition probability indicating a probability that the remote vehicle merges into the current lane of the autonomous vehicle ahead of the autonomous vehicle.

The scenario-specific operational control evaluation model may include a secondary vehicle control action state transition probability indicating a probability that an available distance for traversing the vehicle transportation network by merging from the first lane to the subsequent merged lane passes a minimum threshold.

The scenario-specific operational control evaluation model may include a forward remote vehicle blocking state transition probability indicating a probability that, on a condition that the remote vehicle is ahead of the autonomous vehicle and in the subsequent merged lane, the remote vehicle changes from non-blocking to blocking.

The scenario-specific operational control evaluation model may include a blocking uncertainty observation probability indicating an uncertainty probability for the availability for the portion of the vehicle transportation network corresponding to traversing the vehicle transportation network by merging from the first lane to the subsequent merged lane.

The scenario-specific operational control evaluation model may include a remote vehicle observation probability indicating a correlation between the relative location and velocity of the remote vehicle and a determined location and probability for the remote vehicle.

The scenario-specific operational control evaluation model may include an occlusion observation probability indicating a probability that the remote vehicle is occluded.

In some implementations, the vehicle operational scenario may be the pass-obstruction vehicle operational scenario, and the scenario-specific operational control evaluation model may include an autonomous vehicle relative location state factor representing a location of the autonomous vehicle relative to a current lane.

The scenario-specific operational control evaluation model may include an autonomous vehicle relative location pendency state factor representing a pendency corresponding to the autonomous vehicle having a current value of the autonomous vehicle relative location state factor.

The scenario-specific operational control evaluation model may include a forward obstruction state factor representing a current status of an obstruction ahead of the autonomous vehicle in the current lane.

The scenario-specific operational control evaluation model may include a backward availability state factor representing an availability status of a portion of the vehicle transportation network behind the autonomous vehicle in the current lane.

The scenario-specific operational control evaluation model may include a vehicle control action action factor representing a vehicle control action.

The scenario-specific operational control evaluation model may include an action success observation factor representing a determination whether a difference between an expected vehicle operational environment based on traversing the vehicle transportation network in accordance with a previously identified vehicle control action and a current vehicle operational environment subsequent to traversing the vehicle transportation network in accordance with the previously identified vehicle control action is within a defined threshold.

The scenario-specific operational control evaluation model may include a forward obstruction observation factor representing a determination indicating a change of the current status of the obstruction ahead of the autonomous vehicle.

The scenario-specific operational control evaluation model may include a backward availability observation factor representing a determination indicating a change of the availability status of the portion of the vehicle transportation network behind the autonomous vehicle in the current lane.

In some implementations, the operational environment information may indicate an oncoming remote vehicle in an oncoming lane in the vehicle operational scenario, and the scenario-specific operational control evaluation model may include an oncoming remote vehicle distance state factor representing a distance of the oncoming remote vehicle from the autonomous vehicle.

The scenario-specific operational control evaluation model may include an oncoming remote vehicle location pendency state factor representing a pendency corresponding to the oncoming remote vehicle having a current value of the oncoming remote vehicle distance state factor.

The scenario-specific operational control evaluation model may include an availability state factor representing an availability state of a relative portion of the oncoming lane corresponding to traversing the vehicle transportation network by passing the obstruction in the current lane by traversing the relative portion of the oncoming lane.

The scenario-specific operational control evaluation model may include an oncoming remote vehicle location observation factor representing a determination indicating a change of operational status for the oncoming remote vehicle.

The scenario-specific operational control evaluation model may include an availability observation factor representing a determination indicating a change of the availability state of the relative portion of the oncoming lane corresponding to traversing the vehicle transportation network by passing the obstruction in the current lane by traversing the relative portion of the oncoming lane.

The scenario-specific operational control evaluation model may include an oncoming remote vehicle shielding state transition probability indicating a probability that the oncoming remote vehicle operates such the relative portion of the oncoming lane corresponding to traversing the vehicle transportation network by passing the obstruction in the current lane by traversing the relative portion of the oncoming lane is available.

The scenario-specific operational control evaluation model may include a second oncoming remote vehicle state transition probability indicating a probability that the availability of the relative portion of the oncoming lane corresponding to traversing the vehicle transportation network by passing the obstruction in the current lane by traversing the relative portion of the oncoming lane is available changes from available to blocked in response to another oncoming remote vehicle.

The scenario-specific operational control evaluation model may include a third oncoming remote vehicle state transition probability indicating a probability indicating a probability of a change of the distance of the oncoming vehicle.

The scenario-specific operational control evaluation model may include a fourth oncoming remote vehicle state transition probability indicating probability of the oncoming vehicle transitioning from a current blocking state to a different blocking state.

The scenario-specific operational control evaluation model may include a backward availability state transition probability indicating a probability of a change of availability of the portion of the vehicle transportation network behind the autonomous vehicle in the current lane from available to blocked.

The scenario-specific operational control evaluation model may include a forward obstruction state transition probability indicating a probability of a change of the obstruction ahead of the autonomous vehicle in the current lane.

The scenario-specific operational control evaluation model may include a blocking uncertainty observation probability indicating an uncertainty probability for the availability for the portion of the vehicle transportation network corresponding to traversing the vehicle transportation network by passing the obstruction in the current lane by traversing the relative portion of the oncoming lane.

The scenario-specific operational control evaluation model may include a remote vehicle observation probability indicating a probability of accuracy of observing the remote vehicle based on distance between the autonomous vehicle and the remote vehicle.

The scenario-specific operational control evaluation model may include an occlusion resolution observation probability indicating a probability that an occlusion is resolved in response to traversing the vehicle transportation network in accordance with an edging vehicle control action.

The scenario-specific operational control evaluation model may include a backward availability observation probability indicating a probability of uncertainty for determining the availability of the portion of the vehicle transportation network behind the autonomous vehicle in the current lane.

The scenario-specific operational control evaluation model may include a forward obstruction observation probability indicating a probability of uncertainty for determining a status of the obstruction ahead of the autonomous vehicle in the current lane.

In some implementations, traversing the portion of the vehicle transportation network in accordance with the candidate vehicle control action may include traversing a first portion of the current lane, subsequent to traversing the first portion of the current lane, traversing a first portion of the oncoming lane, and subsequent to traversing the first portion of the oncoming lane, traversing a second portion of the current lane.

In some implementations, traversing the vehicle transportation network may include operating the operational environment monitor to identify the obstruction ahead of the autonomous vehicle in the current lane.

In some implementations, the processor may be configured to execute the instructions stored on the non-transitory computer readable medium to operate the scenario-specific operational control evaluation module instance to, in response to receiving, from an operational environment monitor of the vehicle, operational environment information identifying the vehicle operational scenario, instantiate the scenario-specific operational control evaluation module instance.

In some implementations, the vehicle operational scenario may be the merge vehicle operational scenario, and the processor may be configured to execute the instructions stored on the non-transitory computer readable medium to operate the scenario-specific operational control evaluation module instance to traverse the portion of the vehicle transportation network in accordance with the candidate vehicle control action by merging from a first lane in the vehicle transportation network to a subsequent merged lane of the vehicle transportation network, wherein the first lane and a second lane of the vehicle transportation network merge to form the subsequent merged lane.

In some implementations, the vehicle operational scenario may be the pass-obstruction vehicle operational scenario, and the processor may be configured to execute the instructions stored on the non-transitory computer readable medium to operate the scenario-specific operational control evaluation module instance to traverse the portion of the vehicle transportation network in accordance with the candidate vehicle control action by traversing a first portion of the current lane, subsequent to traversing the first portion of the current lane, traversing a first portion of the oncoming lane, and subsequent to traversing the first portion of the oncoming lane, traversing a second portion of the current lane.

Although not shown separately in FIGS. 6-9, a pedestrian module, such as the pedestrian module 4310 shown in FIG. 4, may include a POMDP model.

The pedestrian POMDP model may define a state space that includes, for example, an autonomous vehicle relative location state factor ($S_l^{AV}$), a pedestrian blocking state factor ($S_b^P$), a priority state factor ($S_p^P$), or a combination thereof, which may be expressed as $S=S_l^{AV} \times S_b^P \times S_p^P$. Other state factors may be included in the pedestrian POMDP model. The autonomous vehicle relative location state factor ($S_l^{AV}$) may indicate a location for the autonomous vehicle relative to a point of intersection between an expected path for the autonomous vehicle and an expected path for the pedestrian, which may be a current location of the pedestrian, and may have a value from a defined set of values, such as {start, approaching, at, intersecting, goal}. The pedestrian blocking state factor ($S_b^P$) may indicate a determination indicating whether the pedestrian, or an expected path for the pedestrian, is currently blocking the autonomous vehicle, and may have a value from a defined set of values, such as {yes, no}. The pedestrian priority state factor ($S_p^P$), which may be orthogonal to the pedestrian blocking state factor ($S_b^P$), may indicate whether the autonomous vehicle or the pedestrian, has priority, or, conversely, whether an expectation that the autonomous vehicle or the pedestrian will yield exceeds a defined threshold, and may have a value from a defined set of values, such as {AV, pedestrian}.

The pedestrian POMDP model may define an action space that includes an action factor that may have a value from a defined set of values, such as {stop, edge, go}. Other action factors may be included in the pedestrian POMDP model.

The pedestrian POMDP model may define an observation space that includes a current location observation factor ($\Omega_l^{AV}$), an availability observation factor ($\Omega_b^P$), a priority observation factor ($\Omega_p^P$), or a combination thereof, which may be expressed as $\Omega=\Omega_l^{AV} \times \Omega_b^P \times \Omega_p^P$. Other observation factors may be included in the pedestrian POMDP model. The current location observation factor ($\Omega_l^{AV}$) may represent a determination indicating a change of location for the autonomous vehicle and may have a value from a defined set of values, such as {yes, no}. The availability observation factor ($\Omega_b^P$) may represent a determination indicating a change of whether the pedestrian is currently blocking the autonomous vehicle, and may have a value from a defined set of values, such as {yes, no}. The priority observation factor ($\Omega_p^P$) may represent a determination of a change of whether the autonomous vehicle or the pedestrian has priority, and may have a value from a defined set of values, such as {AV, pedestrian}.

The pedestrian POMDP model may define state transitions (T) including a probability modifier representing an increase in the probability that the pedestrian is blocking in response to a determination that the pedestrian is within a defined distance from a crosswalk, a probability that the pedestrian may jaywalk, a probability modifier representing an increase in the probability that the pedestrian may be identified within a defined distance from an occlusion, a probability that the pedestrian may yield to autonomous vehicle, a probability that the pedestrian may maintain a current location proximate to the vehicle transportation network, or a combination thereof. Other transition probabilities may be included in the pedestrian POMDP model.

The pedestrian POMDP model may define conditional observation probabilities (O) including a probability of noisy detection of pedestrian motion to determine blocking, and a probability of an undetected pedestrian proximate to an occlusion. Other conditional observation probabilities may be included in the pedestrian POMDP model.

Although not shown separately in FIGS. 6-9, an intersection module, such as the intersection module 4320 shown in FIG. 4, may include a POMDP model.

The intersection POMDP model may define a state space (S) that includes an autonomous vehicle location state factor ($S_l^{AV}$), an autonomous vehicle pendency state factor ($S_t^{AV}$), a remote vehicle location state factor ($S_l^{RV}$), a remote vehicle pendency state factor ($S_t^{RV}$), a blocking state factor ($S_b^{RV}$), a priority state factor ($S_p^{RV}$), or a combination thereof, which may be expressed as $S=S_l^{AV} \times S_t^{AV} \times S_l^{RV} \times S_t^{RV} \times S_b^{RV} \times S_p^{RV}$. Other state factors may be included in the intersection POMDP model. The autonomous vehicle location state factor ($S_l^{AV}$) may indicate a location for the autonomous vehicle relative to the scenario, and may have a value from a defined set of values, such as {start, approaching, at, edged, inside, goal}. The autonomous vehicle pendency state factor ($S_t^{AV}$) may indicate a categorization of a pendency, or temporal period, corresponding to the autonomous vehicle having a current value of the autonomous vehicle location state factor ($S_l^{AV}$), and may have a value from a defined set of values, such as {short, long}. The remote vehicle location state factor ($S_l^{RV}$) may indicate a location for a remote vehicle relative to the scenario, and may have a value from a defined set of values, such as {empty, approaching, at, edge, inside}. The remote vehicle pendency state factor ($S_t^{RV}$) may indicate a categorization of a pendency, or temporal period, corresponding to the remote vehicle having a current value of the remote vehicle location state factor ($S_l^{RV}$), and may have a value from a defined set of values, such as {short, long}. The blocking state factor ($S_b^{RV}$) may indicate a determination indicating whether the remote vehicle, or an expected path for the remote vehicle, is currently blocking the autonomous vehicle, and may have a value from a defined set of values, such as {yes, no}. The priority state factor ($S_p^{RV}$) may indicate a vehicle, such as the autonomous vehicle or the remote vehicle, that has priority, and may have a value from a defined set of values, such as {AV, RV}.

The intersection POMDP model may define an action space that includes an action factor that may have a value from a defined set of values, such as {stop, edge, go}. Other action factors may be included in the intersection POMDP model.

The intersection POMDP model may define an observation space that includes a current location observation factor ($\Omega_l^{AV}$), a remote vehicle location observation factor ($\Omega_l^{RV}$), an availability observation factor ($\Omega_b^{RV}$), a priority observation factor ($\Omega_p^{RV}$), or a combination thereof, which may be expressed as $\Omega=\Omega_l^{AV} \times \Omega_l^{RV} \times \Omega_b^{RV} \times \Omega_p^{RV}$. Other observation factors may be included in the intersection POMDP model. The current location observation factor ($\Omega_l^{AV}$) may represent a determination indicating a change of location for the autonomous vehicle and may have a value from a defined set of values, such as {yes, no}. The remote vehicle location observation factor ($\Omega_l^{RV}$) may represent a determination indicating a change of location for the remote vehicle and may have a value from a defined set of values, such as {yes, no}. The availability observation factor ($\Omega_b^{RV}$) may represent a determination indicating a change of whether the remote vehicle is currently blocking the autonomous vehicle, and may have a value from a defined set of values, such as {yes, no}. The priority observation factor ($\Omega_p^{RV}$) may represent a determination of a change of the vehicle that has priority, and may have a value from a defined set of values, such as {AV, RV}.

The intersection POMDP model may define state transitions T including a probability that the remote vehicle concedes priority to the autonomous vehicle, a probability that the remote vehicle violates priority, or a probability that the remote vehicle stops at a stop sign or does a rolling stop. Other transition probabilities may be included in the intersection POMDP model.

The intersection POMDP model may define conditional observation probabilities (O). Such as a probability of detecting the remote vehicle traversing a defined geospatial location. Other conditional observation probabilities may be included in the intersection POMDP model.

Although not shown separately in FIGS. 6-9, a lane-change module, such as the lane-change module 4330 shown in FIG. 4, may include a POMDP model.

The lane-change POMDP model may define a state space that includes an autonomous vehicle relative location state factor ($S_l^{AV}$), an autonomous vehicle pendency state factor ($S_t^{AV}$), an autonomous vehicle relative velocity state factor ($S_v^{AV}$), a remote vehicle relative location state factor ($S_l^{RV}$), a remote vehicle pendency state factor ($S_t^{RV}$), a blocking state factor ($S_b^{AV}$), a remote vehicle relative velocity state factor ($S_v^{RV}$), or a combination thereof, which may be expressed as $S=S_l^{AV} \times S_t^{AV} \times S_v^{RV} \times S_l^{RV} \times S_t^{RV} \times S_b^{RV} \times S_v^{RV}$. Other state factors may be included in the lane-change POMDP model. The autonomous vehicle relative location state factor ($S_l^{AV}$) may indicate a location for the autonomous vehicle relative to a current lane of the autonomous vehicle, which may be the pre-lane-change lane or the post-lane-change (target or goal) lane, and may have a value from a defined set of values, such as {start, edged, inside, goal}. The autonomous vehicle pendency state factor ($S_t^{AV}$) may indicate a categorization of a pendency, or temporal period, corresponding to the autonomous vehicle having a current value of the autonomous vehicle relative location state factor ($S_l^{AV}$), and may have a value from a defined set of values, such as {short, long}. The autonomous vehicle relative velocity state factor ($S_v^{AV}$) may indicate a velocity of the autonomous vehicle relative to a remote vehicle, a speed limit, or both, and may have a value from a defined set of values, such as {slow, slow-mid, mid, mid-fast, fast}. The remote vehicle relative location state factor ($S_l^{RV}$) may indicate a location for a remote vehicle relative a current lane of the remote vehicle, and may have a value from a defined set of values, such as {empty, behind, at, ahead}. The remote vehicle pendency state factor ($S_t^{RV}$) may indicate a categorization of a pendency, or temporal period, corresponding to the remote vehicle having a current value of the remote vehicle location state factor ($S_l^{RV}$), and may have a value from a defined set of values, such as {short, long}. The blocking state factor ($S_b^{RV}$) may indicate a determination indicating whether the remote vehicle, or an expected path for the remote vehicle, is currently blocking the autonomous vehicle from transitioning to the target lane, and may have a value from a defined set of values, such as {yes, no}. The remote vehicle relative velocity state factor ($S_v^{RV}$) may indicate a velocity of the remote vehicle relative to the autonomous vehicle, another remote vehicle, a speed limit, or a combination thereof, and may have a value from a defined set of values, such as {slow, slow-mid, mid, mid-fast, fast}.

The lane-change POMDP model may define an action space that includes a vehicle control action action factor ($A_l$), a vehicle control action velocity modifier action factor ($A_v$), or both, which may be expressed as $A=A_l \times A_v$. Other action factors may be included in the lane-change POMDP model. The vehicle control action action factor ($A_l$) may represent a vehicle control action and may have a value from a defined set of values, such as {stay, edge, go}. The vehicle control action velocity modifier action factor ($A_v$) may represent a velocity modifier for the vehicle control action indicated by the vehicle control action action factor ($A_l$).

The lane-change POMDP model may define an observation space that includes a current location observation factor ($\Omega_l^{AV}$), an autonomous vehicle relative velocity observation factor ($\Omega_v^{AV}$), a remote vehicle location observation factor ($\Omega_l^{RV}$), an availability observation factor ($\Omega_b^{RV}$), a remote vehicle relative velocity observation factor ($\Omega_v^{RV}$), or a combination thereof, which may be expressed as $\Omega=\Omega_l^{AV} \times \Omega_v^{AV} \times \Omega_l^{RV} \times \Omega_b^{RV} \times \Omega_v^{RV}$. Other observation factors may be included in the lane-change POMDP model. The current location observation factor ($\Omega_l^{AV}$) may represent a determination indicating a change of location for the autonomous vehicle and may have a value from a defined set of values, such as {yes, no}. The autonomous vehicle relative velocity observation factor ($\Omega_v^{AV}$) may indicate determination of a change of velocity of the autonomous vehicle and may have a value from a defined set of values, such as {decrease, maintain, increase}. The remote vehicle location observation factor ($\Omega_l^{AV}$) may represent a determination indicating a change of location for the remote vehicle and may have a value from a defined set of values, such as {empty, behind, at, ahead}. The availability observation factor ($\Omega_b^{RV}$) may represent a determination indicating a change of whether the remote vehicle is currently blocking the autonomous vehicle, and may have a value from a defined set of values, such as {yes, no}. The remote vehicle relative velocity observation factor ($\Omega_v^{RV}$) may indicate determination of a change of velocity of the remote vehicle and may have a value from a defined set of values, such as {decrease, maintain, increase}. The remote vehicle relative location state factor ($S_l^{RV}$) may indicate a location for a remote vehicle relative a current lane of the remote vehicle, and may have a value from a defined set of values, such as {empty, behind, at, ahead}. The remote vehicle pendency state factor ($S_t^{RV}$) may indicate a categorization of a pendency, or temporal period, corresponding to the remote vehicle having a current value of the remote vehicle location state factor ($S_l^{RV}$), and may have a value from a defined set of values, such as {short, long}.

The lane-change POMDP model may define state transitions T including a probability that the remote vehicle accelerates or decelerates at a rate that exceeds a defined threshold, a probability that the remote vehicle changes lanes such that the remote vehicle transitions from blocking to non-blocking, and a probability that the traversal of the vehicle transportation network by the autonomous vehicle is affected by a forward obstacle. Other transition probabilities may be included in the lane-change POMDP model.

The lane-change POMDP model may define conditional observation probabilities (O). Such as a probability of accurately identifying a probability of availability. Other conditional observation probabilities may be included in the lane-change POMDP model.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
   traversing, by an autonomous vehicle, a vehicle transportation network, wherein traversing the vehicle transportation network includes:
      operating a scenario-specific operational control evaluation module instance, wherein the scenario-specific operational control evaluation module instance includes an instance of a scenario-specific operational control evaluation model of a vehicle operational scenario wherein the vehicle operational scenario is a merge vehicle operational scenario or a pass-obstruction vehicle operational scenario, wherein operating the scenario-specific operational control evaluation module instance includes identifying a policy for the scenario-specific operational control evaluation model;
      receiving a candidate vehicle control action from the scenario-specific operational control evaluation module instance; and
      traversing a portion of the vehicle transportation network in accordance with the candidate vehicle control action.

2. The method of claim 1, wherein traversing the vehicle transportation network includes:
   in response to receiving, from an operational environment monitor of the autonomous vehicle, operational environment information identifying the vehicle operational scenario, instantiating the scenario-specific operational control evaluation module instance.

3. The method of claim 2, wherein the vehicle operational scenario is the merge vehicle operational scenario, and wherein traversing the portion of the vehicle transportation network in accordance with the candidate vehicle control action includes merging from a first lane in the vehicle transportation network to a subsequent merged lane of the vehicle transportation network, wherein the first lane and a second lane of the vehicle transportation network merge at a merge-intersection to form the subsequent merged lane.

4. The method of claim 3, wherein traversing the vehicle transportation network includes:
   operating the operational environment monitor to identify the vehicle operational scenario in response to a determination that the first lane and the second lane merge to form the subsequent merged lane.

5. The method of claim 3, wherein the scenario-specific operational control evaluation model includes:
   an immanency state factor representing a distance between a current location of the autonomous vehicle and a location of the merge-intersection proximate to the subsequent merged lane;
   an autonomous vehicle relative location state factor representing a location of the autonomous vehicle relative to a current lane of the autonomous vehicle, wherein the current lane is the first lane or the subsequent merged lane;
   an autonomous vehicle pendency state factor representing a pendency corresponding to the autonomous vehicle having a current value of the autonomous vehicle relative location state factor;
   an autonomous vehicle relative velocity state factor representing a relative velocity of the autonomous vehicle relative to a defined velocity reference;
   an availability state factor representing an availability status of a portion of the vehicle transportation network corresponding to traversing the vehicle transportation network by merging from the first lane to the subsequent merged lane;
   a vehicle control action action factor representing a vehicle control action;
   a vehicle control action velocity modifier action factor representing a velocity modifier for the vehicle control action;
   an immanency observation factor representing a determination whether the immanency for merging from the first lane to the subsequent merged lane passes a defined immanency threshold;
   an autonomous vehicle relative location observation factor representing a determination indicating a change of location for the autonomous vehicle; and
   an autonomous vehicle relative velocity observation factor representing a determination indicating a change of velocity for the autonomous vehicle.

6. The method of claim 5, wherein the operational environment information indicates a remote vehicle in the vehicle operational scenario, and wherein the scenario-specific operational control evaluation model includes:
   a remote vehicle relative location state factor representing a location of the remote vehicle relative to a current remote vehicle lane of the remote vehicle and the autonomous vehicle, wherein the current remote vehicle lane is the first lane, the second lane, or the subsequent merged lane;
   a remote vehicle relative location pendency state factor representing a pendency corresponding to the remote vehicle having a current value of the remote vehicle relative location state factor;
   a remote vehicle relative velocity state factor representing a relative velocity of the remote vehicle relative to a defined remote vehicle velocity reference;
   a remote vehicle relative location observation factor representing a determination indicating a change of location for the remote vehicle;
   an availability observation factor representing a determination indicating a change of availability for the portion of the vehicle transportation network corresponding to traversing the vehicle transportation network by merging from the first lane to the subsequent merged lane;
   a remote vehicle relative velocity observation factor representing a determination indicating a change of velocity for the remote vehicle;
   a remote vehicle acquiescence state transition probability indicating a probability that the remote vehicle operates such that the portion of the vehicle transportation network corresponding to traversing the vehicle transportation network by merging from the first lane to the subsequent merged lane is available;
   a remote vehicle advancing state transition probability indicating a probability that the remote vehicle passes the autonomous vehicle in the second lane;
   an obstructed current lane state transition probability indicating a probability that the current lane of the autonomous vehicle is obstructed along an expected path for the autonomous vehicle;
   a remote vehicle forward merge state transition probability indicating a probability that the remote vehicle merges into the current lane of the autonomous vehicle ahead of the autonomous vehicle;
   a secondary vehicle control action state transition probability indicating a probability that an available distance for traversing the vehicle transportation network by merging from the first lane to the subsequent merged lane passes a minimum threshold;
   a forward remote vehicle blocking state transition probability indicating a probability that, on a condition that the remote vehicle is ahead of the autonomous vehicle and in the subsequent merged lane, the remote vehicle changes from non-blocking to blocking;
   a blocking uncertainty observation probability indicating an uncertainty probability for the availability for the portion of the vehicle transportation network corresponding to traversing the vehicle transportation network by merging from the first lane to the subsequent merged lane; and
   an occlusion observation probability indicating a probability that the remote vehicle is occluded.

7. The method of claim 2, wherein the vehicle operational scenario is the pass-obstruction vehicle operational scenario, and wherein the scenario-specific operational control evaluation model includes:
   an autonomous vehicle relative location state factor representing a location of the autonomous vehicle relative to a current lane;
   an autonomous vehicle relative location pendency state factor representing a pendency corresponding to the autonomous vehicle having a current value of the autonomous vehicle relative location state factor;
   a forward obstruction state factor representing a current status of an obstruction ahead of the autonomous vehicle in the current lane;
   a backward availability state factor representing an availability status of a portion of the vehicle transportation network behind the autonomous vehicle in the current lane;
   a vehicle control action action factor representing a vehicle control action;
   an action success observation factor representing a determination whether a difference between an expected vehicle operational environment based on traversing the vehicle transportation network in accordance with a previously identified vehicle control action and a current vehicle operational environment subsequent to traversing the vehicle transportation network in accordance with the previously identified vehicle control action is within a defined threshold;
a forward obstruction observation factor representing a determination indicating a change of the current status of the obstruction ahead of the autonomous vehicle; and
a backward availability observation factor representing a determination indicating a change of the availability status of the portion of the vehicle transportation network behind the autonomous vehicle in the current lane.

8. The method of claim 7, wherein the operational environment information indicates an oncoming remote vehicle in an oncoming lane in the vehicle operational scenario, and wherein the scenario-specific operational control evaluation model includes:
an oncoming remote vehicle distance state factor representing a distance of the oncoming remote vehicle from the autonomous vehicle;
an oncoming remote vehicle location pendency state factor representing a pendency corresponding to the oncoming remote vehicle having a current value of the oncoming remote vehicle distance state factor;
an availability state factor representing an availability state of a relative portion of the oncoming lane corresponding to traversing the vehicle transportation network by passing the obstruction in the current lane by traversing the relative portion of the oncoming lane;
an oncoming remote vehicle location observation factor representing a determination indicating a change of operational status for the oncoming remote vehicle;
an availability observation factor representing a determination indicating a change of the availability state of the relative portion of the oncoming lane corresponding to traversing the vehicle transportation network by passing the obstruction in the current lane by traversing the relative portion of the oncoming lane;
an oncoming remote vehicle shielding state transition probability indicating a probability that the oncoming remote vehicle operates such the relative portion of the oncoming lane corresponding to traversing the vehicle transportation network by passing the obstruction in the current lane by traversing the relative portion of the oncoming lane is available;
a second oncoming remote vehicle state transition probability indicating a probability that the availability of the relative portion of the oncoming lane corresponding to traversing the vehicle transportation network by passing the obstruction in the current lane by traversing the relative portion of the oncoming lane is available changes from available to blocked in response to another oncoming remote vehicle;
a third oncoming remote vehicle state transition probability indicating a probability of a change of the distance of the oncoming remote vehicle;
a fourth oncoming remote vehicle state transition probability indicating a probability of the oncoming remote vehicle transitioning from a current blocking state to a different blocking state;
a backward availability state transition probability indicating a probability of a change of availability of the portion of the vehicle transportation network behind the autonomous vehicle in the current lane from available to blocked;
a forward obstruction state transition probability indicating a probability of a change of the obstruction ahead of the autonomous vehicle in the current lane;
a blocking uncertainty observation probability indicating an uncertainty probability for the availability for the portion of the vehicle transportation network corresponding to traversing the vehicle transportation network by passing the obstruction in the current lane by traversing the relative portion of the oncoming lane;
a remote vehicle observation probability indicating a probability of accuracy of observing the oncoming remote vehicle based on distance between the autonomous vehicle and the oncoming remote vehicle;
an occlusion resolution observation probability indicating a probability that an occlusion is resolved in response to traversing the vehicle transportation network in accordance with an edging vehicle control action;
a backward availability observation probability indicating a probability of uncertainty for determining the availability of the portion of the vehicle transportation network behind the autonomous vehicle in the current lane; and
a forward obstruction observation probability indicating a probability of uncertainty for determining a status of the obstruction ahead of the autonomous vehicle in the current lane.

9. The method of claim 7, wherein traversing the portion of the vehicle transportation network in accordance with the candidate vehicle control action includes:
traversing a first portion of the current lane;
subsequent to traversing the first portion of the current lane, traversing a first portion of the oncoming lane; and
subsequent to traversing the first portion of the oncoming lane, traversing a second portion of the current lane.

10. The method of claim 7, wherein traversing the vehicle transportation network includes:
operating the operational environment monitor to identify the obstruction ahead of the autonomous vehicle in the current lane.

11. The method of claim 1, wherein the scenario-specific operational control evaluation model is one of a plurality of distinct scenario-specific operational control evaluation models.

12. The method of claim 1, wherein the scenario-specific operational control evaluation model is a machine-learning model.

13. The method of claim 1, wherein the scenario-specific operational control evaluation model is a partially observable Markov decision process model.

14. An autonomous vehicle comprising:
a processor configured to execute instructions stored on a non-transitory computer readable medium to:
operate a scenario-specific operational control evaluation module instance, wherein the scenario-specific operational control evaluation module instance includes an instance of a scenario-specific operational control evaluation model of a vehicle operational scenario wherein the vehicle operational scenario is a merge vehicle operational scenario or a pass-obstruction vehicle operational scenario, wherein operating the scenario-specific operational control evaluation module instance includes identifying a policy for the scenario-specific operational control evaluation model;

receive a candidate vehicle control action from the scenario-specific operational control evaluation module instance; and traverse a portion of the vehicle transportation network in accordance with the candidate vehicle control action.

15. The autonomous vehicle of claim 14, wherein the processor is configured to execute the instructions stored on the non-transitory computer readable medium to operate the scenario-specific operational control evaluation module instance to:

in response to receiving, from an operational environment monitor of the autonomous vehicle, operational environment information identifying the vehicle operational scenario, instantiate the scenario-specific operational control evaluation module instance.

16. The autonomous vehicle of claim 15, wherein the vehicle operational scenario is the merge vehicle operational scenario, and wherein the processor is configured to execute the instructions stored on the non-transitory computer readable medium to operate the scenario-specific operational control evaluation module instance to:

traverse the portion of the vehicle transportation network in accordance with the candidate vehicle control action by merging from a first lane in the vehicle transportation network to a subsequent merged lane of the vehicle transportation network, wherein the first lane and a second lane of the vehicle transportation network merge to form the subsequent merged lane.

17. The autonomous vehicle of claim 15, wherein the vehicle operational scenario is the pass-obstruction vehicle operational scenario, and wherein the processor is configured to execute the instructions stored on the non-transitory computer readable medium to operate the scenario-specific operational control evaluation module instance to traverse the portion of the vehicle transportation network in accordance with the candidate vehicle control action by:

traversing a first portion of the current lane;

subsequent to traversing the first portion of the current lane, traversing a first portion of the oncoming lane; and subsequent to traversing the first portion of the oncoming lane, traversing a second portion of the current lane.

18. The autonomous vehicle of claim 14, wherein:

the scenario-specific operational control evaluation model is one of a plurality of distinct scenario-specific operational control evaluation models; and the scenario-specific operational control evaluation model is a machine-learning model.

19. A method for use in traversing a vehicle transportation network, the method comprising:

traversing, by an autonomous vehicle, a vehicle transportation network, wherein traversing the vehicle transportation network includes:

operating an operational environment monitor to identify a vehicle operational scenario, wherein:

on a condition that the operational environment monitor is a merge operational environment monitor, and, in response to a determination by the operational environment monitor that a first lane in the vehicle transportation network and a second lane of the vehicle transportation network merge to form the subsequent merged lane along an expected path for the autonomous vehicle, operating the operational environment monitor includes identifying a merge vehicle operational scenario as the vehicle operational scenario; and on a condition that the operational environment monitor is a pass-obstruction operational environment monitor, and, in response to a determination by the operational environment monitor that an expected path for the autonomous vehicle includes a forward obstruction, the vehicle transportation network omits an available adjacent lane, and the vehicle transportation network includes an adjacent oncoming lane, operating the operational environment monitor includes identifying a pass-obstruction vehicle operational scenario as the vehicle operational scenario;

in response to receiving, from the operational environment monitor, operational environment information identifying the vehicle operational scenario, instantiating a scenario-specific operational control evaluation module instance, wherein the scenario-specific operational control evaluation module instance includes an instance of a scenario-specific operational control evaluation model of the vehicle operational scenario, wherein instantiating the scenario-specific operational control evaluation module instance includes identifying a policy for the scenario-specific operational control evaluation model, wherein:

in response to a determination that the vehicle operational scenario is the merge vehicle operational scenario, instantiating the scenario-specific operational control evaluation module instance includes instantiating a merge scenario-specific operational control evaluation module instance; and in response to a determination that the vehicle operational scenario is the pass-obstruction vehicle operational scenario, instantiating the scenario-specific operational control evaluation module instance includes instantiating a pass-obstruction scenario-specific operational control evaluation module instance;

receiving a candidate vehicle control action from the scenario-specific operational control evaluation module instance; and traversing a portion of the vehicle transportation network in accordance with the candidate vehicle control action, wherein traversing the portion of the vehicle transportation network in accordance with the candidate vehicle control action includes:

in response to a determination that the vehicle operational scenario is the merge vehicle operational scenario, merging from a current lane in the vehicle transportation network to the subsequent merged lane; and in response to a determination that the vehicle operational scenario is the pass-obstruction vehicle operational scenario:

traversing a first portion of the current lane;

subsequent to traversing the first portion of the current lane, traversing a first portion of the oncoming lane; and subsequent to traversing the first portion of the oncoming lane, traversing a second portion of the current lane.

20. The method of claim 19, wherein:

instantiating the scenario-specific operational control evaluation module instance includes selecting the scenario-specific operational control evaluation model from a plurality of distinct scenario-specific operational control evaluation models; and the scenario-specific operational control evaluation model is a machine-learning model.

* * * * *